United States Patent [19]
Masaki et al.

[11] Patent Number: 5,392,273
[45] Date of Patent: Feb. 21, 1995

[54] OPTICAL STORAGE DRIVE CONTROLLER WITH PREDETERMINED LIGHT SOURCE DRIVE VALUES STORED IN NON-VOLATILE MEMORY

[75] Inventors: Takashi Masaki; Shigenori Yanagi; Shigeru Arai, all of Kawasaki, Japan

[73] Assignee: Fujitsu Limited, Japan

[21] Appl. No.: 23,366

[22] Filed: Feb. 26, 1993

[30] Foreign Application Priority Data

Feb. 28, 1992 [JP] Japan .................................. 4-042684
Mar. 4, 1992 [JP] Japan .................................. 4-047114
Mar. 4, 1992 [JP] Japan .................................. 4-047115

[51] Int. Cl.⁶ .......................................... G11B 7/125
[52] U.S. Cl. ..................................... 369/106; 369/116
[58] Field of Search ................................ 369/106, 116

[56] References Cited

U.S. PATENT DOCUMENTS

| 5,050,156 | 9/1991 | Barton ................. 369/116 |
| 5,172,365 | 12/1992 | Call et al. ............. 369/116 |
| 5,185,733 | 2/1993 | Finkelstein et al. ........ 369/54 |
| 5,185,734 | 2/1993 | Call et al. ............. 369/116 |
| 5,220,549 | 6/1993 | Yanagidate ............. 369/116 |
| 5,233,175 | 8/1993 | Latta et al. ............ 369/116 |
| 5,237,558 | 8/1993 | Horikiri et al. .......... 369/116 |
| 5,321,679 | 6/1994 | Horiguchi .............. 369/116 |

FOREIGN PATENT DOCUMENTS

| 55-97646 | 7/1980 | Japan . |
| 56-80754 | 7/1981 | Japan . |
| 60-185175 | 5/1985 | Japan . |
| 61-104372 | 5/1986 | Japan . |
| 62-80737 | 4/1987 | Japan . |
| 323524 | 1/1991 | Japan . |
| 325628 | 2/1991 | Japan . |
| 3251934 | 11/1991 | Japan . |
| 419833 | 1/1992 | Japan . |

*Primary Examiner*—Paul M. Dzierzynski
*Assistant Examiner*—Kim-Kwok Chu
*Attorney, Agent, or Firm*—Greer, Burns & Crain, Ltd.

[57] ABSTRACT

A control method and controller for an optical storage drive including: an optical head having a laser light source for applying light to an optical disk and a detector for receiving reflected light from the optical disk; and a seek mechanism for positioning the optical head on the optical disk. The control method includes: measuring a drive current value with which the laser light source provides a predetermined light power value by an emission adjustment; writing the measured drive current value into a non-volatile memory as an initial value; adjusting the emission of the laser light source so that it provides the predetermined light power value; and comparing the drive current value with which the emission adjustment has been made with the initial value stored in the non-volatile memory. Also disclosed is a control method which measures and stores a write power value providing optimum write performance in a non volatile memory for controlling the power of the laser light source with the measured value.

30 Claims, 16 Drawing Sheets

Fig. 8
(A)
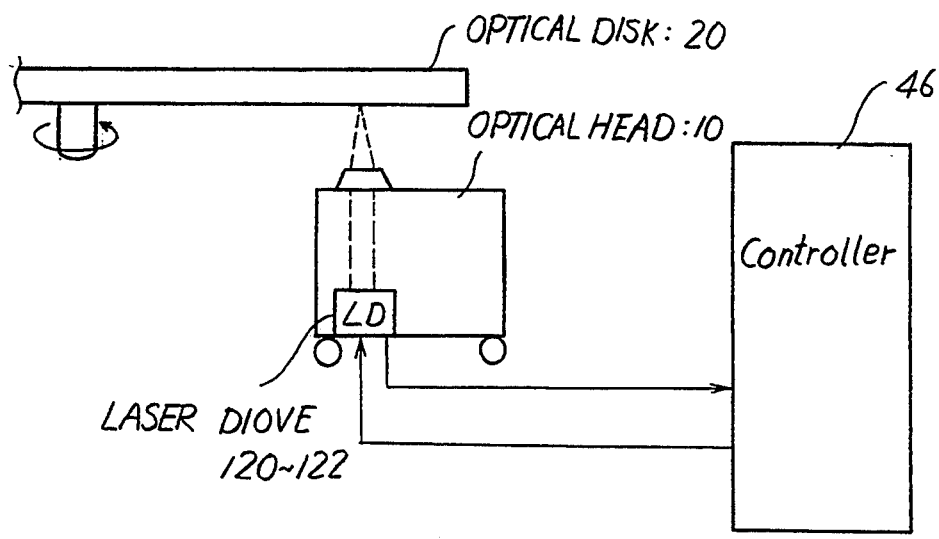
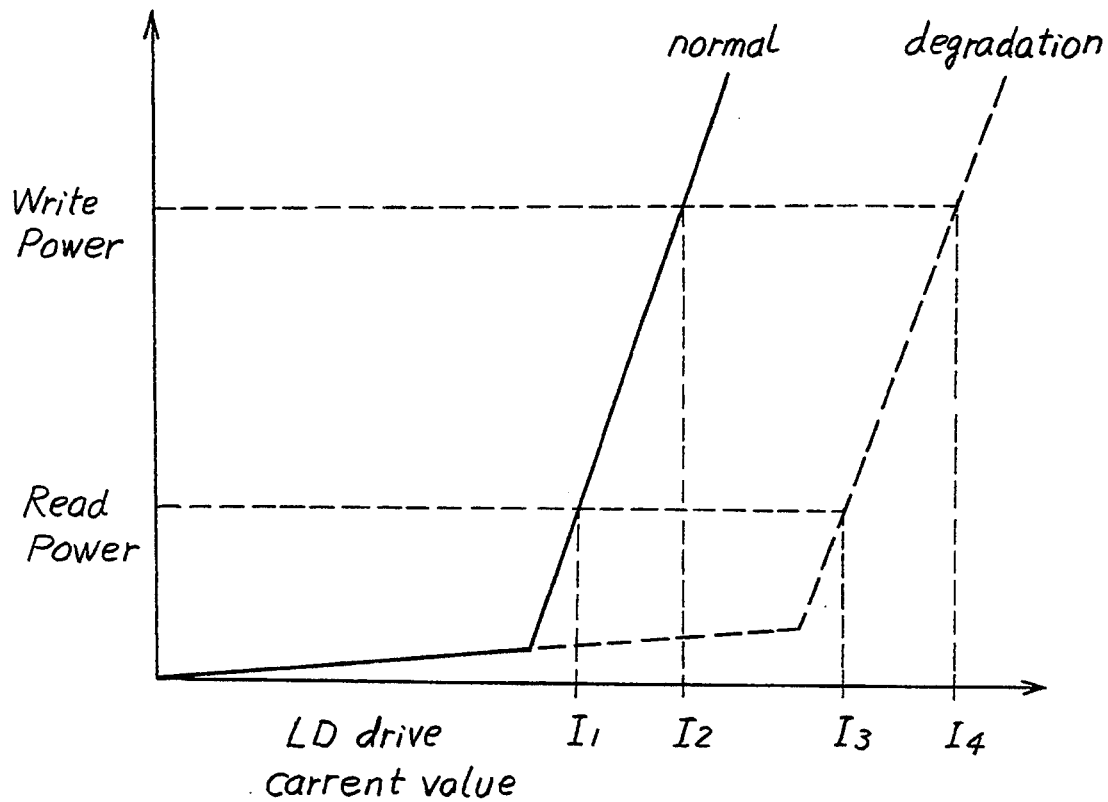
Fig. 8 (B)

Fig. 13
(A) Measurement at Startup of drive
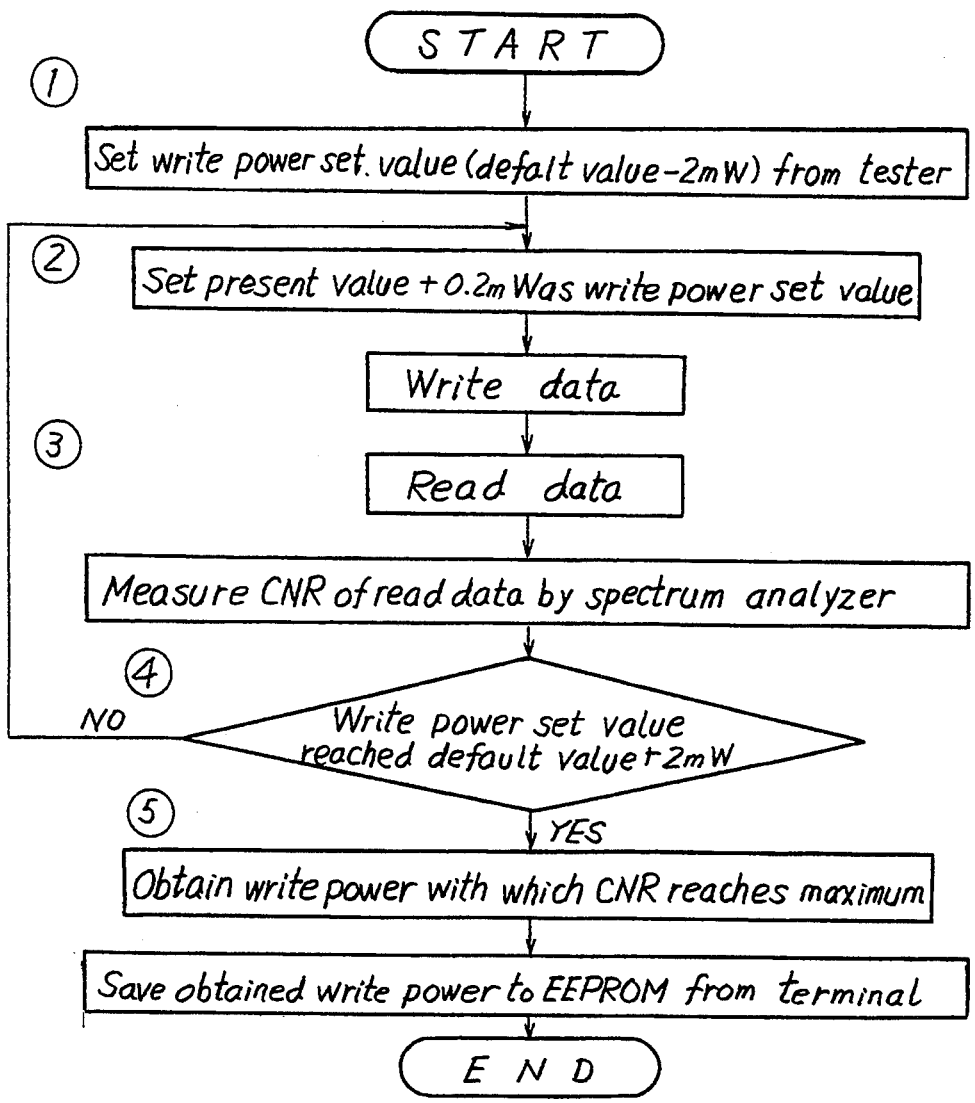
Fig. 13 (B) When power supply is turned on
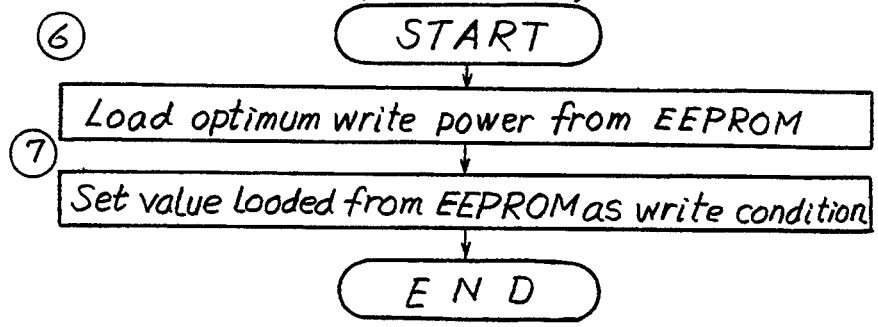

OPTICAL STORAGE DRIVE CONTROLLER WITH PREDETERMINED LIGHT SOURCE DRIVE VALUES STORED IN NON-VOLATILE MEMORY

BACKGROUND OF THE INVENTION

1. Field of the Invention

The present invention relates to a controller and control method for an optical storage drive. More particularly, the present invention relates to a controller having a non-volatile memory stored with information for management of an optical storage drive and also pertains to an optical storage drive control method using such a non-volatile memory.

In a typical optical disk drive (including magneto-optical disk drive), illuminating light from a laser diode in an optical head is applied to the surface of a rotating disk-shaped recording medium, i.e., optical disk, thereby recording information. The recorded information is reproduced by detecting changes in properties (quantity of light, plane of polarization, etc.) of the reflected light from the optical disk, which is illuminated with the light from the optical head. The optical disk has information tracks provided over the surface thereof from the inner periphery to the outer periphery of the disk. Since there are differences in operating characteristics among optical disk drives, management information such as control information differs for each drive. For this reason, a memory for storing management information for each individual drive is needed.

2. Description of the Related Art

Since optical disk drives that use a laser light source vary from each other in operating characteristics, it is necessary to give various considerations as follows.

Firstly, an optical disk drive needs to output a predetermined level of light power from a laser light source. Therefore, before the drive is started to operate, for example, when the power supply is turned on, the drive current for the laser light source is adjusted so that the output of the laser light source coincides with a predetermined level of light power. This process is termed emission adjustment. However, laser light sources, particularly laser diodes, degrade when used for a long time or if an overcurrent is applied thereto. If the laser light source degrades, the value of the drive current required for outputting a predetermined level of light power increases. If the degradation further progresses, it becomes impossible to obtain the required light power even if the maximum current is supplied. In such a case, recording, reproduction, etc. cannot normally be effected any longer.

Accordingly, it is necessary to check the lifetime of the laser diode of the optical head beforehand. For this purpose, the following method has heretofore been employed: A limit current value obtained from design values is preset, and upon completion of the emission adjustment, the current value obtained by the emission adjustment is compared with the limit current value. If the adjusted current value exceeds the limit current value, it is decided that the lifetime of the laser diode has expired.

With this method, however, it is difficult to set the limit current value uniquely because of variation in circuit and laser light source performances among optical disk drives. In addition, if the limit current value is set at a large value, some laser light sources may become degraded before the adjusted current value reaches the limit current value, resulting in a failure to effect a normal write/read operation. If the limit current value is set at a small value, it may be decided that the lifetime of the laser light source has expired before it becomes completely degraded. In such a case, the laser light source is replaced with a new one although it is still usable, which is wasteful.

Secondly, when data is to be written with an optical disk drive, if the write power and the write pulse width deviate from the optimum values, a proper write operation cannot be effected. In general, after a write operation, data written is read (termed "verify read") to check whether or not the data has normally been written. In this way, the write operation can be confirmed. Even if the write operation has not properly been effected, write data errors can be relieved to a certain extent by ECC (Error Correcting Code) processing of the reproduced signal.

However, if the number of data errors increases, it may become impossible to correct all the data errors even by ECC processing. In such a case, the written data is rewritten to an alternate region (alternate block) provided in a certain area on the optical disk medium, thereby relieving the error. This is termed alternate processing. Accordingly, if the write power and the write pulse width deviate from the optimum values, there will be an increase in the number of times when it is decided by the verify read that the data has not normally been written and hence the alternate processing is executed.

Since the number of alternate blocks is limited, if the alternate processing is executed many times, the alternate blocks may be used up. In such a case, it becomes impossible to write data to the medium any longer although the area of the medium used for normal recording has not yet been used up, which is extremely wasteful.

Further, if the write power and the write pulse width deviate from the optimum values at the time of writing, data may be written to the very limit of the margin even if it is decided by the verify read that the data has normally been written. For this reason, degradation of the medium by aging and the number of stains on the medium surface increases, the incidence of data read errors increases in comparison to the incidence of data errors at the time of writing. Accordingly, it may be impossible to correct all the data errors even by the ECC processing. This gives rise to a problem that data which must have normally been written cannot be read afterward.

Hitherto, optimum values for write conditions have been uniquely determined for all drives by experiments and set in firmware as parameters during design or manufacture. However, there is variation in performance of circuits and optical systems among optical disk drives, and optimum write values differ for each drive. Accordingly, in each individual optical disk drive, the uniquely set write conditions may deviate from the actual optimum values, so that the drive cannot exhibit the given write performance. It may be considered to adopt a method wherein optimum write values are measured for each individual optical disk drive and the measured values are set by using DIP switches, for example. With this method, however, the operation is difficult to automate and hence complicated.

Thirdly, optical disk drives are widely used, and many optical disk drives appear in the field. These drives vary from each other in the performance of the optical head and that of the seek mechanism, although such performance variation is within a certain range. Therefore, it is common practice to operate each individual optical disk drive at the time of startup before shipment to check the operating performance of the drive. Further, at the time of extra maintenance (replacement or adjustment of a unit due to occurrence of a fault) or regular maintenance after the shipment, the optical disk drive is operated to make a diagnosis on the operating performance. For example, a magneto-optical disk drive is operated and measured for the CNR (Carrier-to-Noise Ratio) of the reproduced signal, the write/read error rate and the average seek speed by using a tester, thereby making a diagnosis on the operating performance. For such drives as vary in performance from each other, it is necessary to manage data on the performance of each individual drive in order to verify the performance.

In the conventional management of the optical disk drive performance, data on the operating performance, which is measured at the time of startup before shipment, is recorded on a data sheet for each drive, and this data sheet is kept for maintenance purposes. At the time of replacement or adjustment of a unit or during regular maintenance after the shipment, the optical disk drive is operated to measure the operating performance. If the measured values are within a predetermined normal range, the operating performance is judged to be good, and the results of the measurement are recorded on a data sheet, e.g., a maintenance table. In this way, data on the operating performance of each individual optical disk drive has heretofore been managed.

Although the operating performance measured at the time of startup before shipment is the reference performance of the optical disk drive, the actual operating performance cannot be checked by comparison with it. Therefore, at the time of replacement of a unit, for example, it is impossible to check accurately whether or not the required performance is satisfactorily obtained with the new unit. Thus, the checking can be made only approximately. It may be considered to utilize the data sheet, prepared for the optical disk drive concerned at the time of startup before shipment, when a unit is replaced or adjusted. However, it is not easy to manage data sheets for optical disk drives which are shipped in large quantities abroad as well as at home. It is practically impossible to find the associated data sheet when a fault has occurred.

OBJECT AND SUMMARY OF THE INVENTION

It is an object of the present invention to provide an improved controller and control method for an optical storage drive.

It is another object of the present invention to provide a controller and control method for an optical storage drive whereby the lifetime of the laser light source can be checked with higher accuracy even if there is variation in performance among drives.

It is still another object of the present invention to provide a controller and control method for an optical storage drive whereby optimum write conditions can be set even if there is variation in performance among drives.

It is a further object of the present invention to provide a controller and control method for an optical storage drive whereby data on the operating performance of each individual drive can readily be managed for each drive.

The present invention provides a controller for an optical storage drive including an optical head having a laser light source for applying light to an optical storage medium and a detector for receiving reflected light from the optical storage medium and for converting the received light into an electric signal, and a seek mechanism for positioning the optical head to a target position on the optical storage medium to, at least, read information from the target position on the optical storage medium by the optical head. The controller has a non-volatile memory stored with an initial drive current value with which the laser light source provides a predetermined light power level in an emission adjustment made by varying the drive current value for the laser light source, and a control circuit that compares a measured drive current value with which the laser light source provides the predetermined light power value in an emission adjustment made by varying the drive current value for the laser light source when the drive is operated, with the initial drive current value stored in the non-volatile memory, thereby checking the lifetime of the laser light source.

According to the controller for an optical storage drive of the present invention, the non-volatile memory is stored in advance with an initial drive current value with which emission adjustment has been made, and at the time of a later emission adjustment made when the drive is operated in actual use, the initial drive current value is read out from the non-volatile memory and compared with a measured drive current value with which the emission adjustment has been made. Thus, even if there is variation in the performance of the laser light source or other components among the optical storage drives, the lifetime of the laser light source of the drive concerned can accurately be checked by comparison of the measured value with the initial value thereof. Accordingly, it is possible to check the lifetime of the laser light source accurately in accordance with the performance of each individual optical storage drive.

In addition, the present invention provides a controller for an optical storage drive including an optical head having a laser light source for applying light to an optical storage medium and a detector for receiving reflected light from the optical storage medium and for converting the received light into an electric signal, and a seek mechanism for positioning the optical head to a target position on the optical storage medium to write information to the target position on the optical storage medium and to read information from the target position by the optical head. The controller has a non-volatile memory stored with a write drive value providing optimum write performance, which is measured by writing information to the optical storage medium with the write drive value for the laser light source being varied, and a control circuit that reads out the measured value from the non-volatile memory at the time of starting the operation of the drive and controls the drive of the laser light source with the measured value.

According to the controller for an optical storage drive of the present invention, the measured optimum write condition value is stored in the non-volatile memory in advance, and when the operation of the drive is started, the control circuit reads out the optimum write condition value from the non-volatile memory and controls the laser light source to the readout optimum write condition value. Accordingly, even if there is variation in the performance of writing to an optical storage medium among drives, write control can be effected with the optimum write condition value for the drive concerned. Thus, the write performance can be improved. Moreover, since the measured value is automatically written into the non-volatile memory, the controller can cope with automation.

In addition, the present invention provides a controller for an optical storage drive including an optical head having a laser light source for applying light to an optical storage medium and a detector for receiving reflected light from the optical storage medium and for converting the received light into an electric signal, and a seek mechanism for positioning the optical head to a target position on the optical storage medium to write information to the target position on the optical storage medium and to read information from the target position by the optical head. The controller has a non-volatile memory stored in advance with data on measured operating performance of the optical storage drive, and a control circuit for reading out the operating performance data from the non-volatile memory and outputting it to the outside in response to an external instruction.

According to the controller for an optical storage drive of the present invention, the operating performance measured at the time of startup of the drive can readily be understood, and diagnosis, maintenance and so forth can be made accurately and easily.

Other features and advantages of the present invention will be apparent from the following description taken in conjunction with the accompanying drawings.

BRIEF DESCRIPTION OF THE DRAWINGS

FIG. 8(A) is a schematic generally depicting an optical disk drive according to the invention.

FIG. 8(B) is a graph generally depicting laser diode drive current versus laser diode emission power.

FIG. 13(A) is a flowchart to illustrate measuring processing at the time of startup of a drive in accordance with the invention.

FIG. 13(B) is a flow chart depicting processing when the power supply is turned on in accordance with the invention.

DESCRIPTION OF THE PREFERRED EMBODIMENTS

Figure 1:
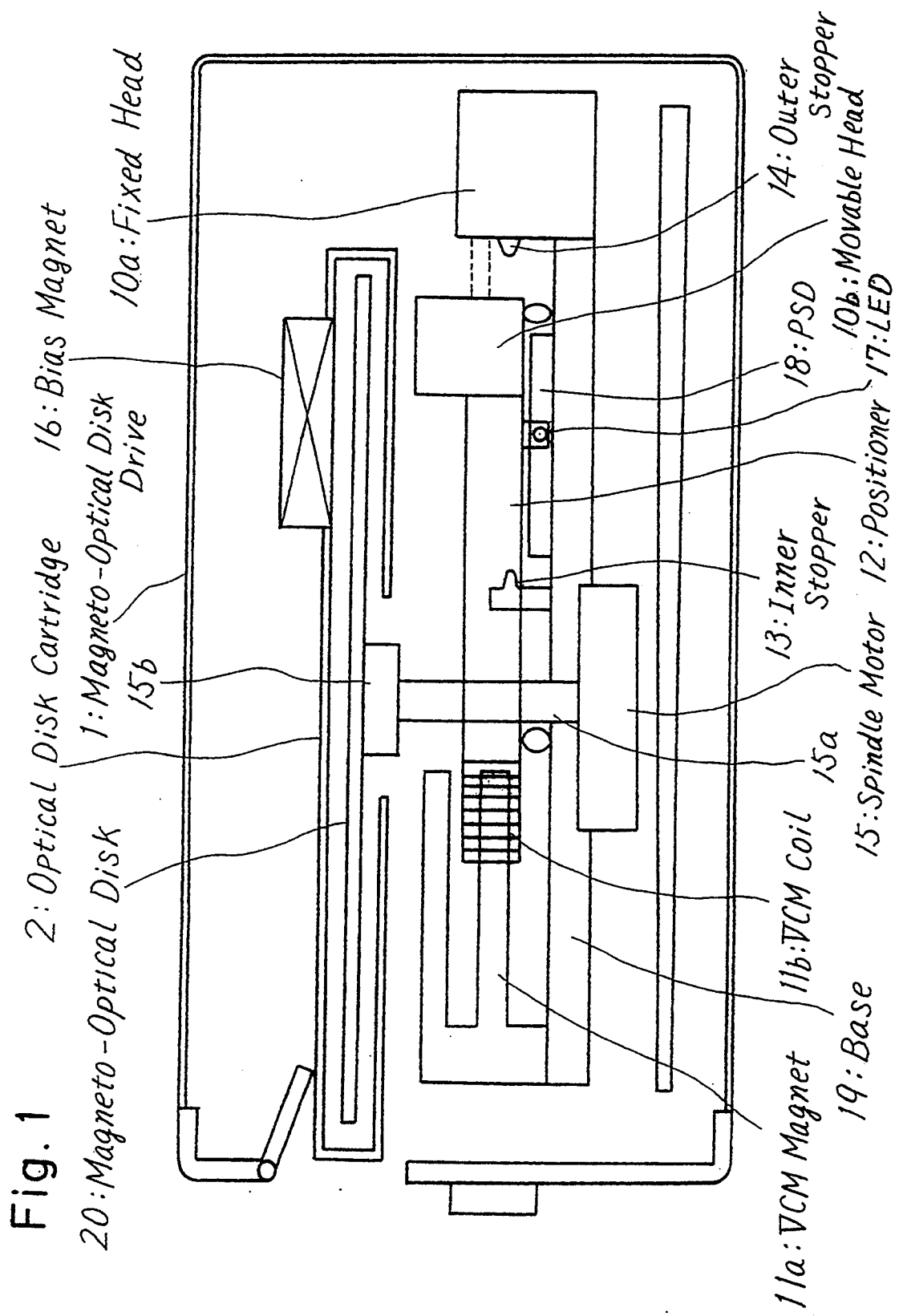
FIG. 1 is a sectional view of a magneto-optical disk drive according to one embodiment of the present invention.
Figure 2:
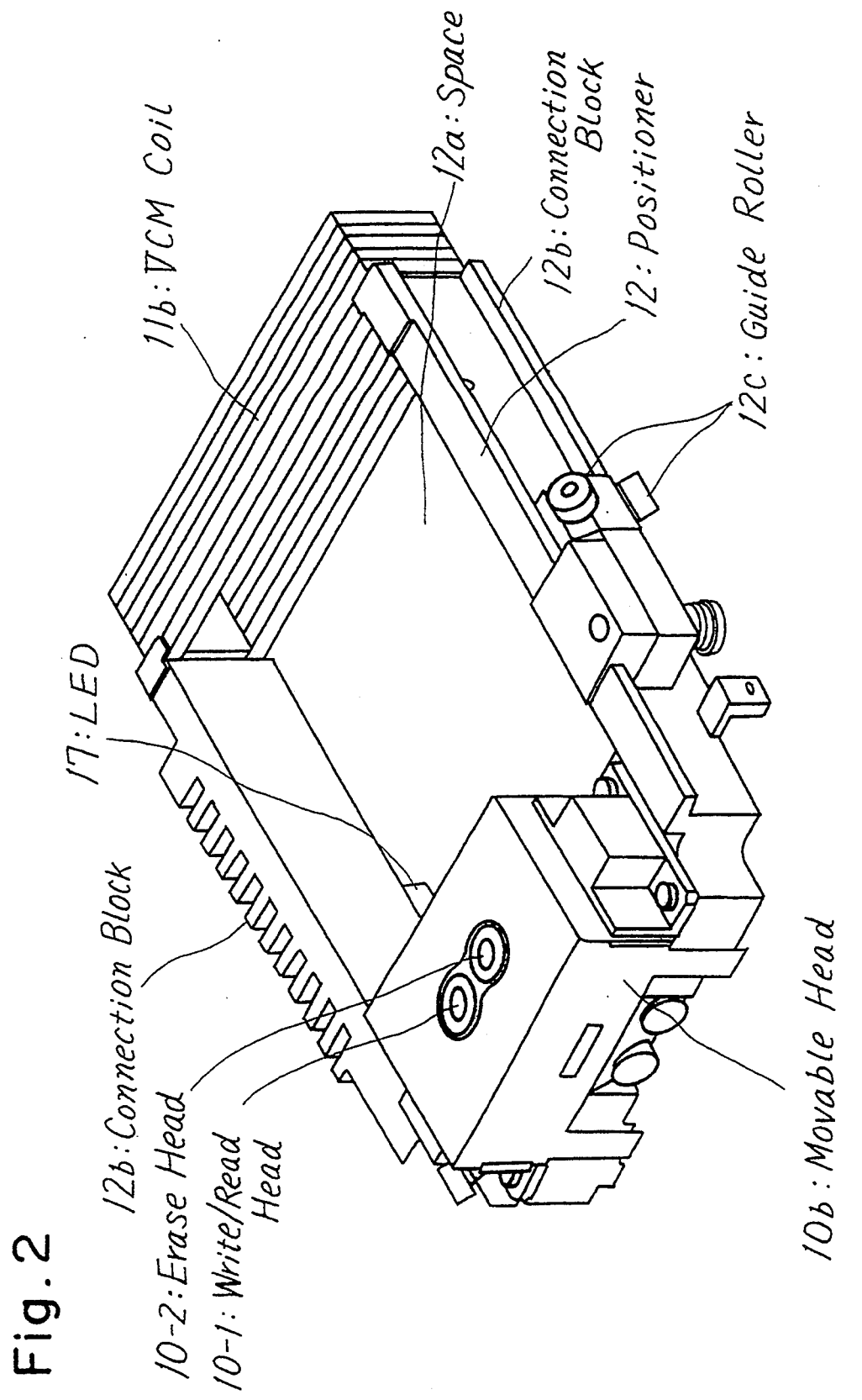
FIG. 2 is a perspective view of a positioner in the magneto-optical disk drive shown in FIG. 1.
Figure 3:
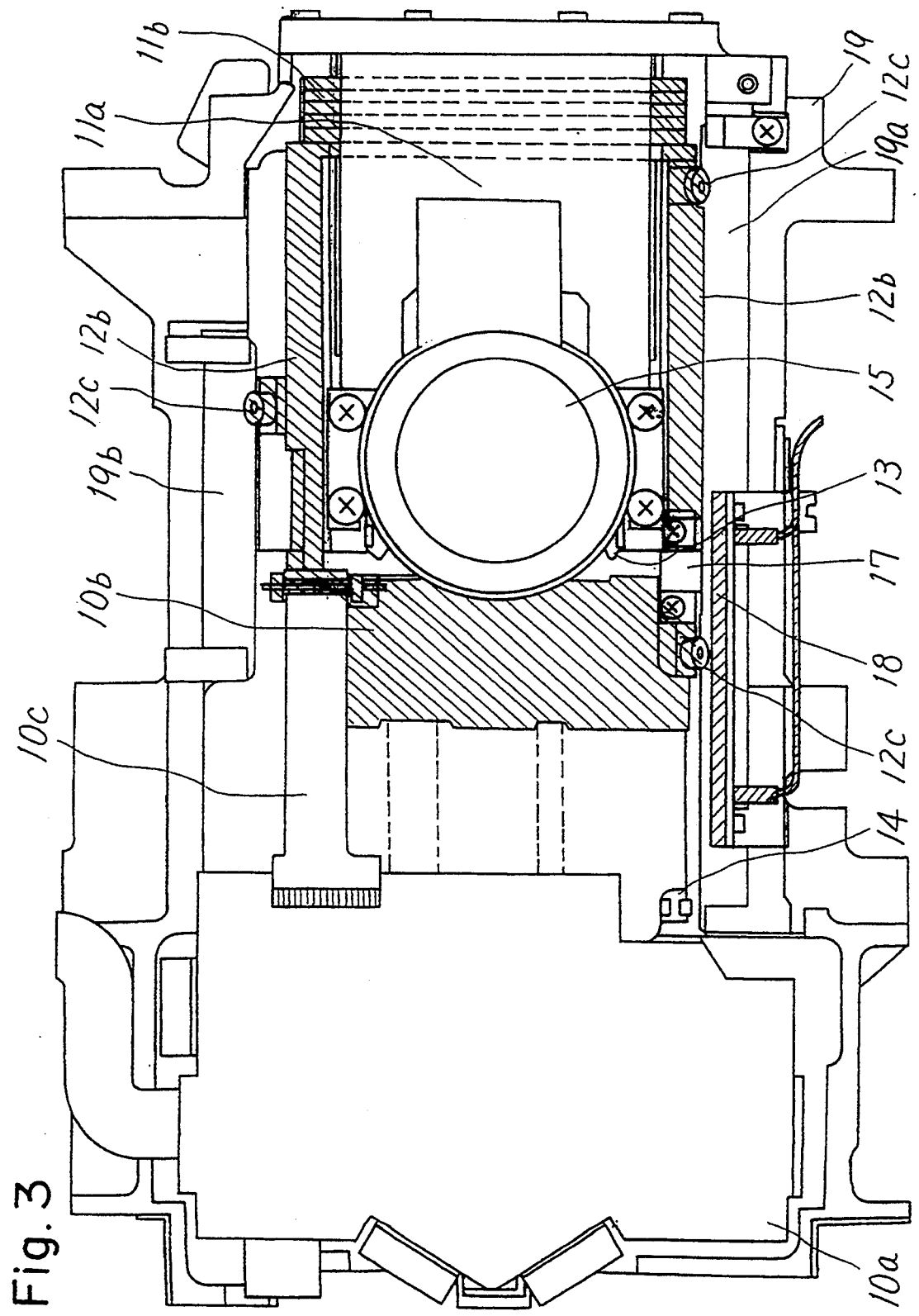
FIG. 3 is a rear view of a seek mechanism of the magneto-optical disk drive shown in FIG. 1.
Figure 4:
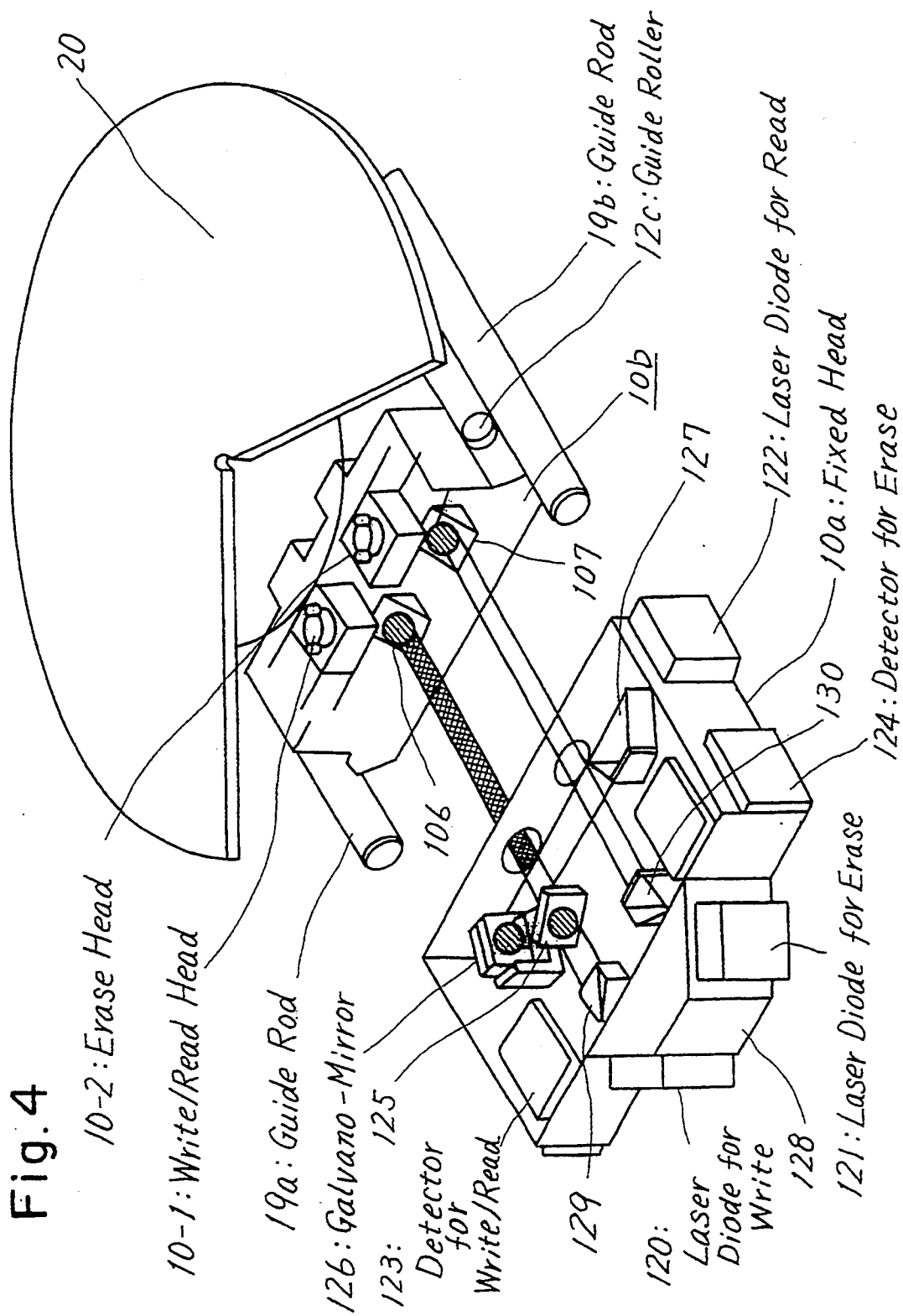
FIG. 4 is a perspective view of an optical head in the arrangement shown in FIG. 3.
Figure 5:
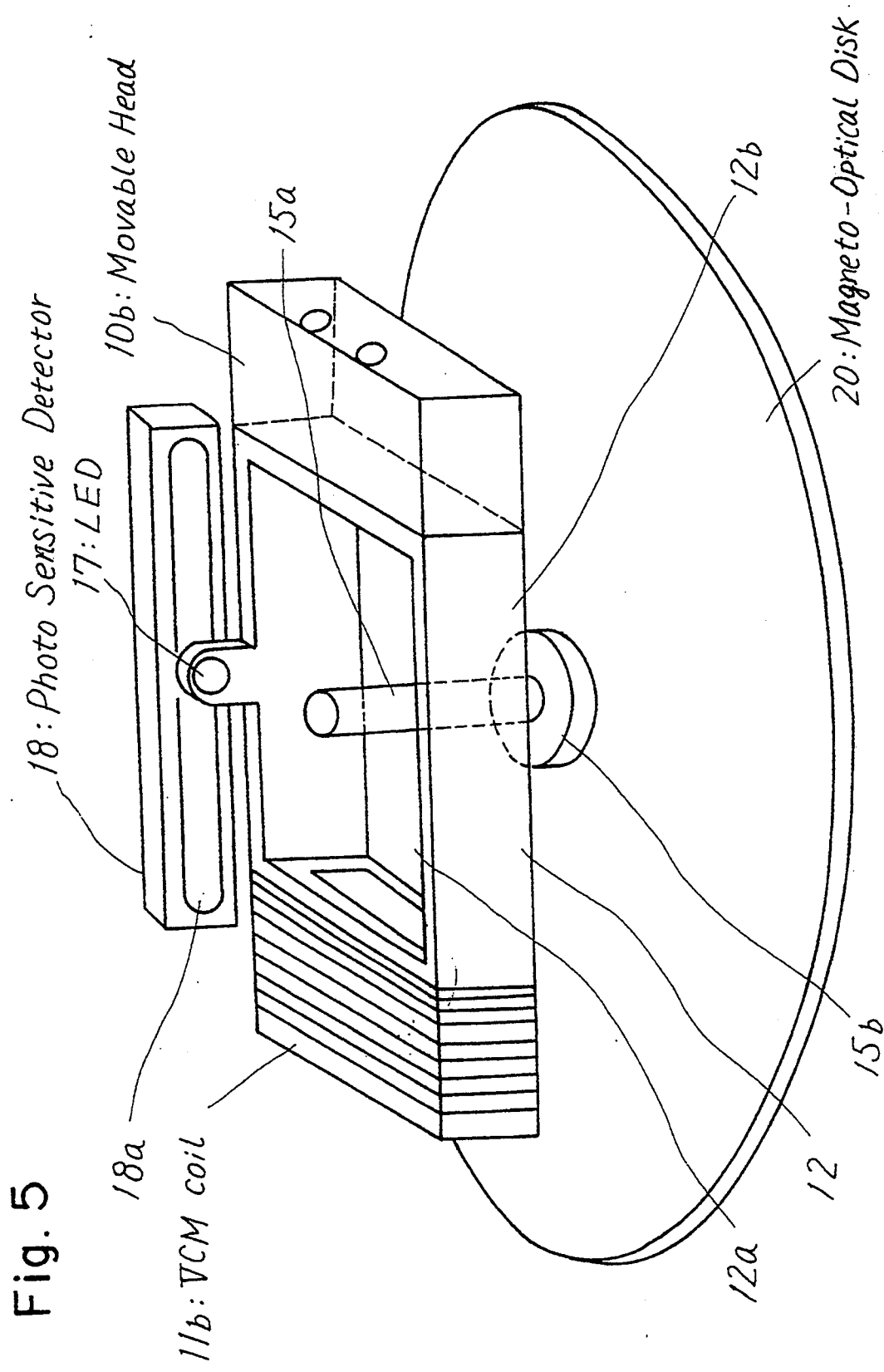
FIG. 5 is a rear perspective view of the seek mechanism shown in FIG. 3.

FIG. 1 is a sectional view of a magneto-optical disk drive according to one embodiment of the present invention; FIG. 2 is a perspective view of a positioner shown in FIG. 1; FIG. 3 is a rear perspective view of a seek mechanism shown in FIG. 1; FIG. 4 is a perspective view of an optical head shown in FIG. 1; and FIG. 5 is a rear perspective view of the seek mechanism shown in FIG. 1.

Referring to FIG. 1, a magneto-optical disk drive 1 is loaded with an optical disk cartridge 2 to read and/or write a magneto-optical disk 20 in the optical disk cartridge 2 loaded. The magneto-optical disk drive 1 ejects the optical disk cartridge 2 in response to an eject instruction. A fixed part 10a of an optical head 10 is secured to a base 19. The fixed part (hereinafter referred to as "fixed head") 10a accommodates a light-emitting part, a light-receiving part, etc. among components of the optical head 10. A movable part 10b of the optical head 10 is secured to a positioner 12 and optically connected to the fixed head 10a. The movable part (hereinafter referred to as "movable head") 10b accommodates a lens optical system for applying light to the magneto-optical disk 20 in the optical disk cartridge 2.

A VCM magnet 11a is secured to the base 19 to constitute a magnet of a voice coil motor (VCM) 11. A VCM coil 11b is provided on the positioner 12 to constitute a coil of the VCM 11. Thus, the VCM coil 11b constitutes the voice coil motor 11 in combination with the VCM magnet 11a. By the operation of the voice coil motor 11, the movable head 10b is driven radially of the magneto-optical disk 20. Reference numeral 12 denotes a positioner which is provided with the movable head 10b and the VCM coil 11b. The positioner 12 is movable radially of the magneto-optical disk 20 relative to the base 19.

An inner stopper 13 for the positioner 12 is provided on the base 19 to define a mechanical inner limit position of the positioner 12. An outer stopper 14 for the positioner 12 is provided on the base 19 to define a mechanical outer limit position of the positioner 12. A spindle motor 15 is provided on the base 19 to rotate the magneto-optical disk 20. The spindle motor 15 has a rotating shaft 15a provided with a chucking mechanism 15b for chucking the magneto-optical disk 20 in the optical disk cartridge 2. A bias magnet 16 applies a magnetic field to the magneto-optical disk 20 to enable writing to the magneto-optical disk 20 by light.

A light-emitting device 17 comprises a light emitting diode (LED) and is provided on the bottom of the positioner 12 to apply light to a one-dimensional optical position detector 18. The one-dimensional optical position detector 18 comprises a one-dimensional photo-sensitive light detector (S3270, available from Hamamatsu Photoelectronics K.K.) and is provided on the base 19 along the path of movement of the positioner 12. The one-dimensional optical position detector 18 generates a current output corresponding to a position illuminated with light from the LED 17 to thereby effect position detection. Reference numeral 19 denotes a base on which are mounted the spindle motor 15, the fixed head 10a, the VCM magnet 11a, the one-dimensional position detector 18, the inner stopper 13, the outer stopper 14 and so forth. The optical disk cartridge 2 has the magneto-optical disk 20 accommodated therein and is removably loaded into the magneto-optical disk drive 1.

As shown in the perspective view of FIG. 2, the positioner 12 has a pair of connection blocks 12b. The VCM coil 11b is secured to the rear ends of the connection blocks 12b. The movable head 10b is secured to the forward ends of the connection blocks 12b. A space 12a is defined between the connection blocks 12b. As shown in FIG. 1, the shaft 15a and chuck mechanism 15b of the spindle motor 15 are disposed in the space 12a. The space 12a is formed with such a size that the shaft 15a and chuck mechanism 15b of the spindle motor 15 will not interfere with the positioner 12 within the range of movement thereof. In addition, guide rollers 12c are provided on both sides, respectively, of each connection block 12b, thereby enabling smooth movement of the positioner 12. The above-described LED 17 is provided on one of the connection blocks 12b in the vicinity of the movable head 10b.

The movable head 10b is provided with a write/read head 10-1 and an erase head 10-2. The heads 10-1 and 10-2 each apply light to the magneto-optical disk 20, which lies above them as viewed in the figure, and receive the reflected light from the disk 20. As shown in FIG. 2, the LED 17 is provided on the lower side of one connection block 12b, that is, the side which faces away from the direction in which the heads 10-1 and 10-2 of the movable head 10b apply light (upwardly as viewed in the figure). With the arrangement that the LED 17 is provided on the side that faces away from the direction in which the movable head 10b applies light, there is no likelihood that stray light of the illuminating light from the movable head 10 or the reflected light will intermingle with the light from the LED 17. Therefore, accurate position detection can be realized.

As shown in the rear view of FIG. 3, the fixed head 10a is secured to one end of the base 19, while the VCM coil 11a is secured to the other end of the base 19. The fixed head 10a and the movable head 10b are electrically connected together through a flexible cable 10c. The spindle motor 15 is provided in the center of the base 19. Guide rods 19a and 19b are provided on both sides, respectively, of the central portion of the base 19. The guide rods 19a and 19b are each held by the pair of guide rollers 12c provided on the corresponding connection block 12b of the positioner 12. Thus, the rectilinear movement of the positioner 12 relative to the base 19 is guided.

Further, the one-dimensional photo-sensitive light detector 18 is provided on one side of the base 19 in parallel to the path of movement of the positioner 12. The one-dimensional photo-sensitive light detector 18 comprises a Si photodiode, as is well known, and generates a current output corresponding to the position of a light spot on the photo-sensitive surface of the photodiode. The details of this principle are described, for example, in the August 1990 issue of the monthly magazine of "Transistor Technology", pp.468-470. The LED 17 is provided on the positioner 12 at a position which faces the one-dimensional photo-sensitive light detector 18.

Next, the movable head 10b and the fixed head 10a will be explained. As shown in FIG. 4, the fixed head 10a is a 3-beam type head, which has as light sources a laser diode for write 120, a laser diode for erase 121, and a laser diode for read 122. The fixed head 10a has a detector for write/read 123 that receives the reflected light from the magneto-optical disk 20 during a read/write operation, and a detector for erase 124 that receives the reflected light from the magneto-optical disk 20 during an erase operation. Further, the fixed head 10a has three prisms 129, 130 and 127, a half-mirror 125, and a galvano-mirror 126.

On the other hand, the movable head 10b has the write/read head 10-1 and the erase head 10-2, as has been described in connection with FIG. 2. The heads 10-1 and 10-2 each have an objective lens and a track/focus actuator for driving the objective lens in track and focus directions. Further, the movable head 10b has optical path changing mirrors 106 and 107.

The optical head 10, which comprises the movable head 10b and the fixed head 10a, constitutes a 3-beam, 2-head optical head. Accordingly, during read/tracking, light from the laser diode for read 122 of the fixed head 10a enters the half-mirror 125 via the prism 127 and the galvano-mirror 126. The incident light is reflected by the half-mirror 125 so as to emerge from the fixed head 10a and enter the movable head 10b. At the movable head 10b, the incident light from the fixed head 10a is led to the write/read head 10-1 by the optical path changing mirror 106 and applied to the magneto-optical disk 20 by the write/read head 10-1. The reflected light from the magneto-optical disk 20 is received by the write/read head 10-1 and then reflected by the optical path changing mirror 106 so as to go out to enter the fixed head 10a. At the fixed head 10a, the incident light from the movable head 10b is received by the detector 123 via the half-mirror 125 and the prism 129. In this way, a track/focus error signal and a readout signal are obtained.

Similarly, during writing, light from the laser diode for write 120 of the fixed head 10a is directed to enter the movable head 10b via the prism 129 and the half-mirror 125. At the movable head 10b, the incident light from the fixed head 10a is led to the write/read head 10-1 by the optical path changing mirror 106 and applied to the magneto-optical disk 20 by the write/read head 10-1. The reflected light from the magneto-optical disk 20 is received by the write/read head 10-1 and then directed by the optical path changing mirror 106 so as to go out to the fixed head 10a. At the fixed head 10a, the incident light from the movable head 10b is received by the detector 123 via the half-mirror 125 and the prism 129.

During erasing, light from the detector for erase 124 of the fixed head 10a is directed to enter the movable head 10b via the prism 130. At the movable head 10b, the incident light from the fixed head 10a is led to the erase head 10-2 by the optical path changing mirror 107 and applied to the magneto-optical disk 20 by the erase head 10-2. The reflected light from the magneto-optical disk 20 is received by the erase head 10-2 and then directed by the optical path changing mirror 107 so as to go out to the fixed head 10a. At the fixed head 10a, the incident light from the movable head 10b is received by the detector 124 via the prism 130.

Thus, the optical head 10 is divided into the movable head 10b that is equipped with only movable parts, i.e., the objective lens, the track/focus actuator, etc., and the fixed head 10a that is equipped with the light-emitting part, the light-receiving part and the associated optical systems, and the fixed head 10a and the movable head 10b are optically connected to each other. With this arrangement, it is possible to reduce the weight of the movable head 10b, which is a movable part, and hence possible to drive it at high speed. Accordingly, the seek time can be shortened. Further, as shown in FIG. 5, the one-dimensional photo-sensitive light detector 18 is provided on the reverse side, which faces away from the direction in which the movable head 10b applies light, and the LED 17 is provided on the positioner 12 in the vicinity of the movable head 10b. Thus, since the light-emitting part 17 is provided independently, it is possible to effect position detection and perform a seek operation even when the optical head 10 emits no light. In addition, it is possible to obtain an adequate quantity of light to effect accurate position detection by the one-dimensional photo-sensitive light detector 18. Thus, an accurate seek operation can be realized. Further, since the positioner 12 is arranged so as to provide the space 12a for the shaft 15a of the spindle motor 15, the width of the system can be reduced with a high-speed VCM used as the VCM 11.

Figure 6:
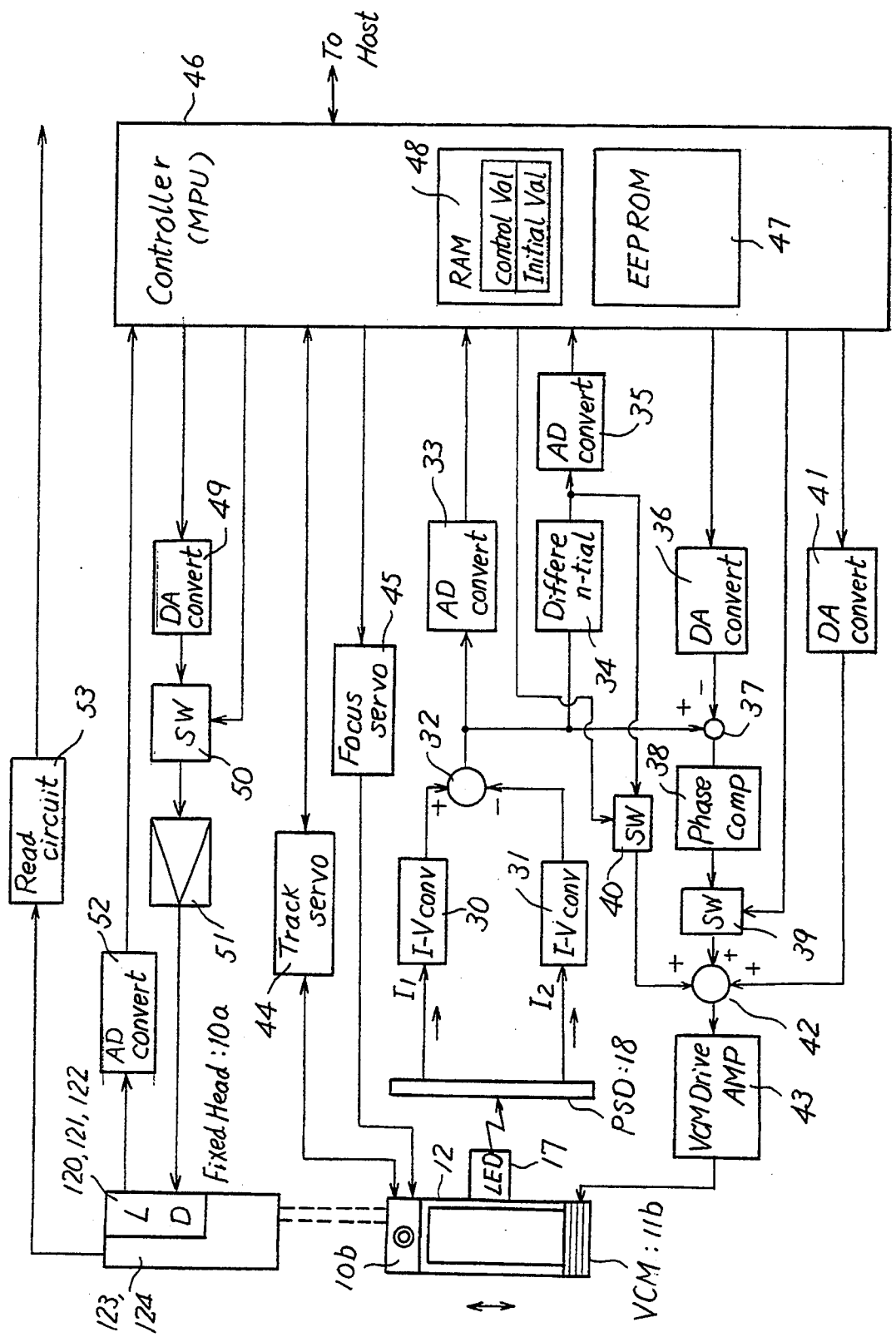
FIG. 6 is a block diagram of a seek control circuit according to one embodiment of the present invention.

Next, the controller will be explained with reference to FIG. 6. In FIG. 6, current-to-voltage converters 30 and 31 convert current outputs I1 and I2 at two ends of the one-dimensional photo-sensitive light detector 18 into voltages V1 and V2, respectively. A subtraction circuit 32 subtracts the voltage V2 from the voltage V1 to generate a position signal. An analog-to-digital converter 33 converts an analog position signal into a digital position signal and outputs it to a controller 46. A differentiating circuit 34 differentiates the analog position signal to output a speed signal. An analog-to-digital converter 35 converts the analog speed signal into a digital speed signal and feeds it to the controller 46. A digital-to-analog converter 36 converts a digital drive signal from the controller 46 into an analog drive signal. A subtraction circuit 37 subtracts the analog drive signal from the analog position signal to generate an analog position error signal.

A phase compensator 38 advances the phase of a high-frequency component of the position error signal to make phase compensation. A first switch 39 connects the phase compensator 38 to a sum circuit 42 under control of the controller 46. A second switch 40 connects the differentiating circuit 34 to the sum circuit 42. A digital-to-analog converter 41 converts a digital drive signal from the controller 46 into an analog drive signal. The sum circuit 42 sums up the position error signal applied thereto through the first switch 39, the speed signal applied thereto through the second switch 40, and the drive signal from the DA converter 41. A VCM drive amplifier 43 drives the VCM coil 11b of the positioner 12 on the basis of the output of the sum circuit 42.

Figure 7:
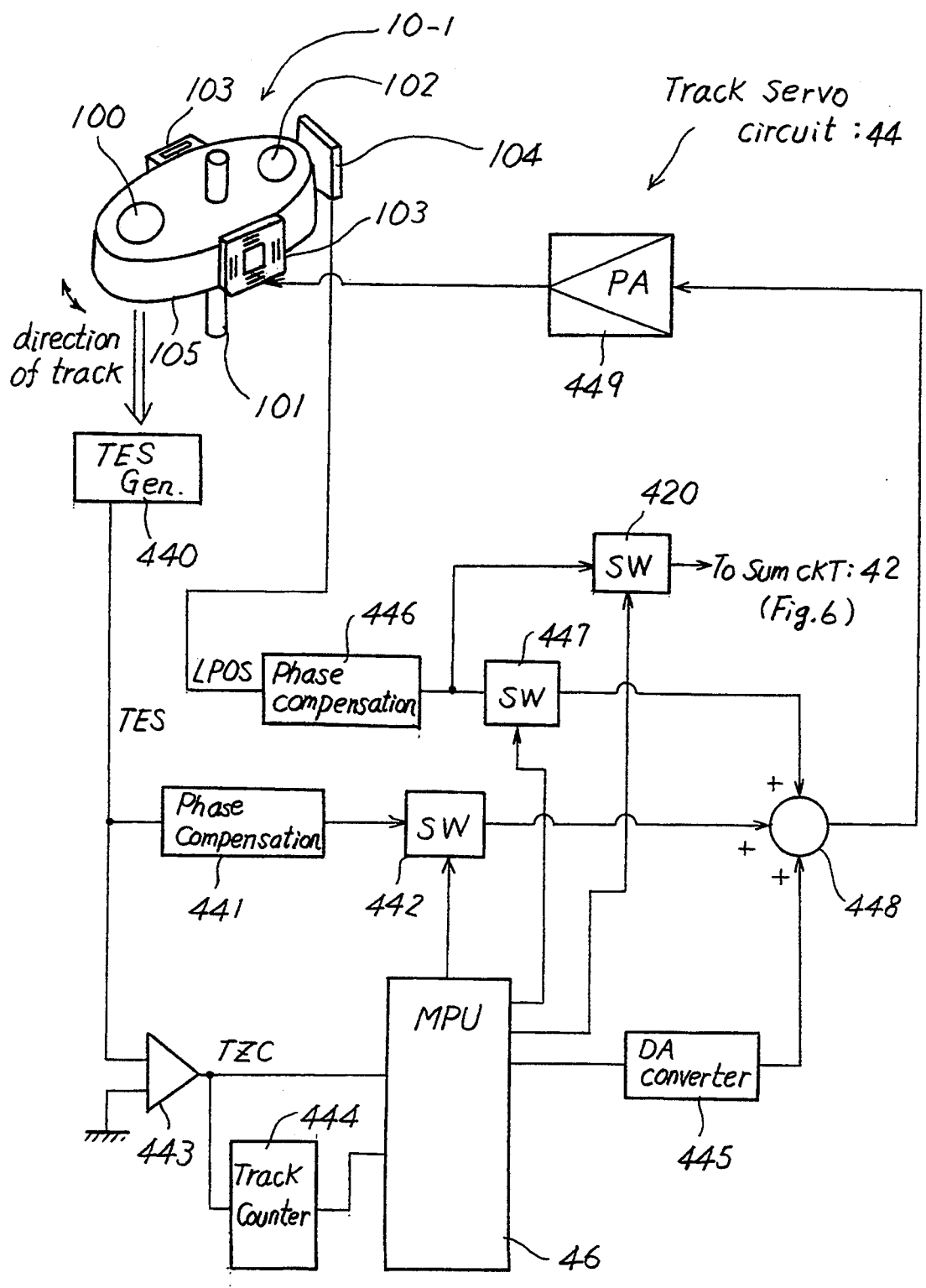
FIG. 7 is a block diagram of a track servo circuit in the seek control circuit shown in FIG. 6.

A track servo control circuit 44 detects a track error signal TES derived from the reflected light from the magneto-optical disk 20, which is received by the detector of the fixed head 10a, and it servo-controls the track actuator of the movable head 10b on the basis of the detected track error signal TES, as will be detailed in connection with FIG. 7. A focus servo control circuit 45 detects a focus error signal FEB derived from the reflected light from the magneto-optical disk 20, which is received by the detector of the fixed head 10a, and it servo-controls the focus actuator of the movable head 10b on the basis of the focus error signal FES. The controller 46 comprises a microprocessor (MPU) and performs seek control and other control by execution of programs. A non-volatile memory 47 comprises an EEPROM (Electrically Erasable Programmable Read Only Memory) and stores parameters and other necessary data. A RAM (Random Access memory) 48 is stored with control information used in the MPU 46.

A DA converter 49 converts a write power value for the laser diode 120, etc., which is delivered from the MPU 46, into an analog drive quantity. A switch 59 outputs the analog drive quantity to a laser diode driver circuit 51 under control of the MPU 46. The laser diode driver circuit 51 drives the laser diode 120, etc. to emit light with the analog drive quantity. An AD converter 52 converts a monitor light quantity output from a monitor diode, e.g., the laser diode 120, into a digital value and inputs it to the MPU 46. A read circuit 53 sums up the detector outputs derived from the reflected light from the magneto-optical disk 20, which is received by the fixed head 10a, to generate and output a readout signal after subjecting it to error correction in a ECC circuit.

In this embodiment, the VCM coil 11 can be driven by a combination of the position error signal, which is a difference between the drive signal from the controller (hereinafter referred to as "processor") 46 and the position signal, the speed signal, and the drive signal from the processor 46.

The track servo control circuit will be explained below with reference to FIG. 7. The heads 10-1 and 10-2 of the movable head 10b each have an objective lens 100 provided at one end of a head 105 rotatable about a rotating shaft 101, and a counterweight 102 at the other end of the head 105. In addition, a track actuator coil 103 is provided on the side of the head 105. A lens position detector 104 for detecting the lens position is provided in opposing relation to the head 105.

A track error signal generator 440 generates a track error signal TES from the detector output derived from the reflected light from magneto-optical disk 20, which is received through the objective lens 100. A phase compensator 441 advances the phase of a high-frequency component of the track error signal TES to make phase compensation. A third switch 442 turns on in response to a track servo ON signal from the processor 46 to form a track servo loop. A comparator 443 level-slices the track error signal TES to generate a track zero crossing signal TZC. A track counter 444 is set with a number of tracks to be crossed for moving by the processor 46, and it is decremented in response to the track zero crossing signal TZC to indicate the number of tracks remaining. A DA converter 445 converts a digital speed signal from the processor 46 into an analog speed signal.

A phase compensator 446 advances the phase of a high-frequency component of a lens position signal LPOS from the lens position detector 104 to make phase compensation. A fourth switch 447 turns on in response to a lens lock signal from the processor 46 to form a lens lock servo loop. A fifth switch 420 outputs the lens position signal LPOS from the phase compensator 446 to the sum circuit 42, shown in FIG. 6, to drive the VCM coil 11b. A sum circuit 448 sums up the track error signal TES from the third switch 442, the lens position signal LPOS from the fourth switch 447, and the speed signal from the DA converter 445. A power amplifier 449 drives the track actuator coil 103 on the basis of the output of the sum circuit 448.

Next, a seek operation that is executed by using the one-dimensional photo-sensitive light detector 18 will be explained. The processor 46 calculates an output value X for a target position r, and outputs the drive signal X to the DA converter 36, and then turns on the first switch 39. Consequently, the subtraction circuit 37 generates a position error signal representative of a difference between the position signal from the one-dimensional photo-sensitive light detector 18 and the drive signal X from the DA converter 36. The position error signal is applied to the VCM coil 11b through the phase compensator 38, the first switch 39, the sum circuit 42 and the VCM drive amplifier 43, causing the positioner 12 to move for seek.

When the position error signal becomes zero, it is decided that the positioner 12 has been positioned at the target position. At this time, the speed becomes zero. The processor 46 monitors the speed signal from the AD converter 35. When the speed signal becomes zero, the processor 46 decides that the seek has been completed, and terminates the seek operation.

This seek operation is effectively employed for the following seek operations rather than an ordinary seek operation for moving the optical head 10 to the user zone: a GO HOME seek operation for moving the positioner 12, together with the optical head 10, to the inner stopper 13; a seek operation for moving the optical head 10 to a mirror zone of the medium for the adjustment of emission of the laser diode of the optical head 10; a seek operation for moving the optical head 10 to a PEP (Phase Encoded Part) zone to read data from it; etc. The ordinary seek operation for moving the optical head 10 to a track in the user zone is effected by detecting a position of the optical head 10 on the basis of the count of pulses of the track error signal TES.

Next, an ordinary track access (seek) operation will be explained.

The objective lens 100 of the optical head 10 is allowed to follow tracks on the medium 20 rotating at high speed by the operation of the track actuator 103. The track actuator 103 is combined with a magnetic circuit provided in the optical head 10 to make the objective lens 100 follow tracks. The operation will be explained below by way of an example of a lens seek operation in which the objective lens 100 is moved across less than several hundreds of tracks.

The processor 46 sets an amount of movement (difference) on the track counter 444. Next, the processor 46 outputs an acceleration signal to the DA converter 445 for lens seek, and turns off the third switch 442 to turn off the track servo, and then enables the track counter 444. Consequently, the objective lens 100 of the optical head 10 moves in the track direction for seek, and the track counter 444 decrements the count value by track zero crossing signals TZC derived from the track error signal TES and indicates the number of tracks remaining. The processor 46 obtains an actual speed from the interval of the track zero crossing signals TZC to decide whether or not the target speed has been reached.

When deciding that the target speed has been reached, the processor 46 reads the track counter 444 to decide whether or not the number of tracks remaining is zero. If the number of tracks remaining is not zero, the processor 46 detects an actual speed from the track zero crossing signals TZC to calculate a target speed corresponding to the number of tracks remaining, and obtains a speed error, that is, a difference between the actual speed and the target speed calculated. Then, the processor 46 outputs the speed error signal to the DA converter 445 to drive the optical head 10. When the number of tracks remaining reaches zero, the processor 46 turns on the third switch 442 to turn on the track servo loop. Then, the processor 46 checks whether or not off-track has occurred by checking track error signal TES. If no off-track has occurred, the processor 46 brings the process to a normal termination.

In this way, the seek operation is carried out. When the number of tracks to be crossed exceeds several hundreds, the processor 46 outputs the drive signal to the DA converter 41, shown in FIG. 6, instead of outputting it to the DA converter 445, shown in FIG. 7, to drive the VCM 11b for a seek operation.

Next, an operation of checking the lifetime of the laser light source will be explained.

Figure 9:
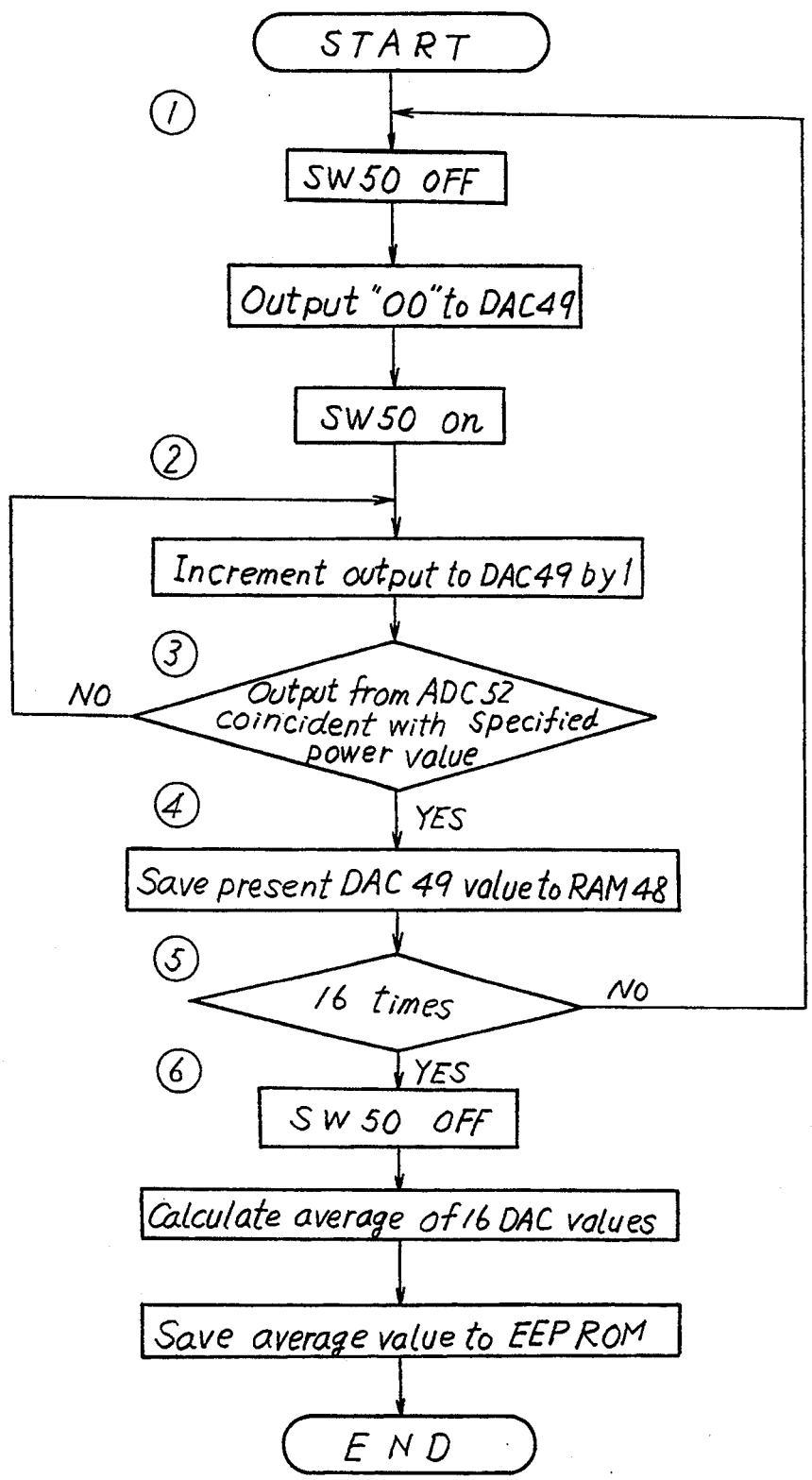
FIG. 9 is a flowchart showing initial value measuring processing for the checking of the lifetime of the laser light source shown in FIG. 8.
Figure 10:
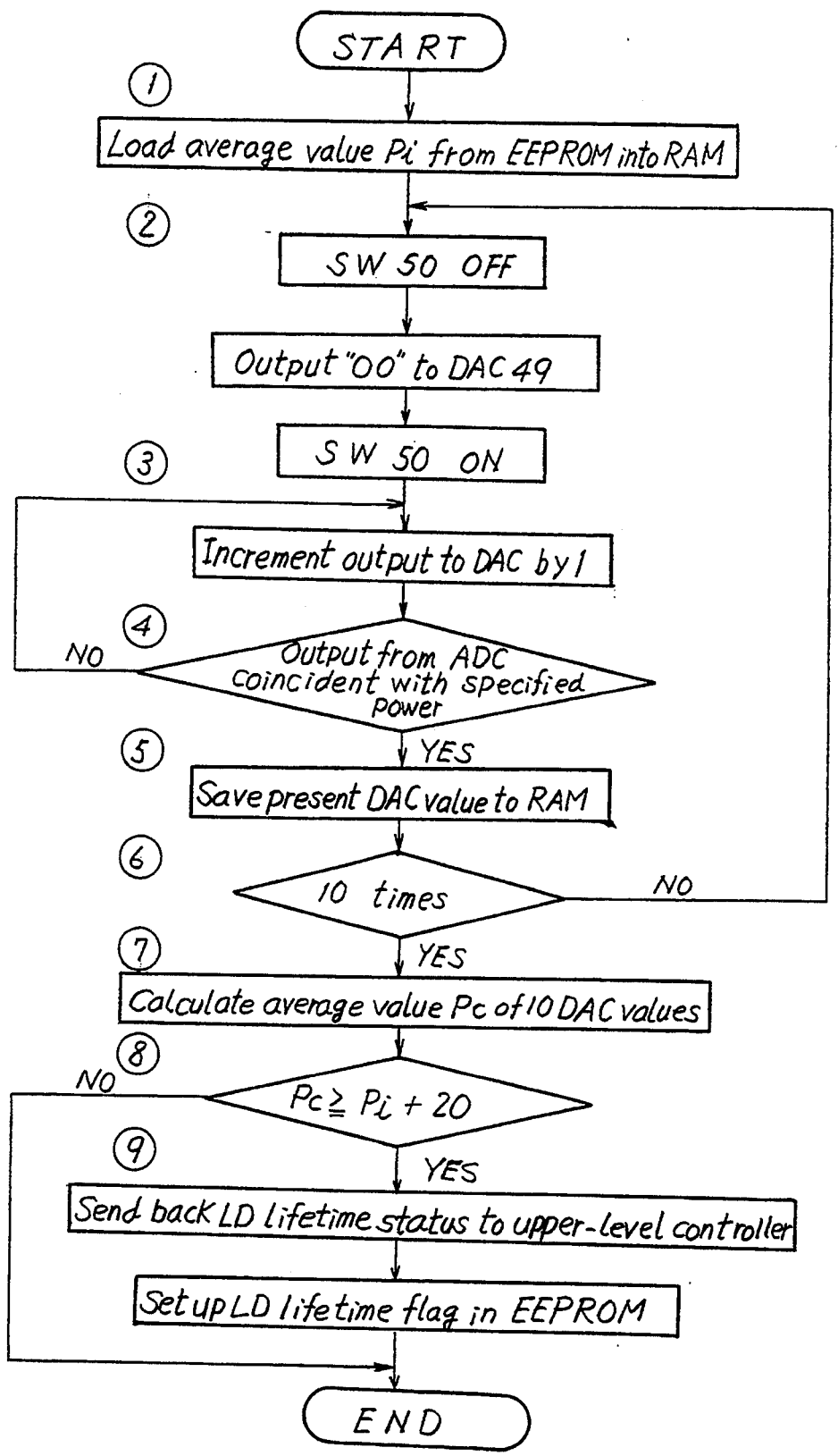
FIG. 10 is a flowchart showing processing for the checking of the lifetime of the laser light source shown in FIG. 8.

FIGS. 8(A) and 8(B) are for explanation of the laser light source lifetime checking operation according to the present invention. FIG. 9 is a flowchart showing measuring processing executed at the time of startup of the drive shown in FIGS. 8(A) and 8(B). FIG. 10 is a flowchart showing emission adjustment processing executed when the power supply is turned on in the arrangement shown in FIG. 8(A).

Processing for measuring an adjusted current value for the laser light source at the time of startup of the drive will be explained below with reference to FIG. 9.

① The processor 46 turns off the switch 50 and outputs "00" as a control value to the DA converter 49. Then, the processor 46 turns on the switch 50 to drive the laser diodes 120 to 122 through the drive amplifier 51.

② The processor 46 increments the control value by 1 and outputs the incremented control value to the DA converter 49, thereby driving the laser diodes 120 to 122 through the switch 50 and the drive amplifier 51.

③ The processor 46 reads the monitor light quantities of the laser diodes 120 to 122 through the AD converter 52 and decides whether or not the light power of each of the laser diodes 120 to 122 coincides with specified power. If the light power is lower than the specified power, the processor 46 returns to Step ②.

At this time, if the drive has an optical head which is designed to read and write the optical disk 20 with a single beam, since the write power is larger than the read power, as shown in FIG. 8(A), the write power is used as specified power to make emission adjustment of the laser diode. If the drive has an optical head which is designed to read, write and erase the magneto-optical disk 20 with a single beam, since the erase power is the largest, it is used as specified power to make emission adjustment of the laser diode.

In the case of the optical head 10, shown in FIG. 2, which uses 3 beams for read, write and erase, respectively, the laser diodes 120 to 122 are individually subjected to emission adjustment with the read power, write power and erase power used as specified power, respectively.

④ If the light power of the laser diode (120 to 122) coincides with the specified power, the processor 46 stores the control value presently output to the DA converter 49 into the RAM 48.

⑤ The processor 46 decides whether or not the operation of Steps e,crc/1/ to ④ has been repeated 16 times. If NO, the processor 46 returns to Step ①.

⑥ When deciding that the operation of Steps ① to ④ has been repeated 16 times, the processor 46 turns off the switch 50. Then, the processor 46 calculates an average value Pi of the control values for the 16 control operations, which have been stored in the RAM 48, and writes the average value into the EEPROM 47 as an initial value.

In this way, a control value with which each of the laser diodes 120 to 122 generates predetermined light power is measured at the time of startup of the drive before shipment, and the measured value is written into the non-volatile memory 47 so as to be used as an initial value when the drive is actually operated. In FIG. 8(B), the drive current values I1 and I2 on the solid-line curve are the initial values.

Next, lifetime checking processing which is executed when the power supply of the drive is turned on after the shipment will be explained with reference to FIG. 10.

① When the power supply is turned on, the processor 46 reads out the average value Pi from the EEPROM 47 and loads it in the RAM 46.

② The processor 46 turns off the switch 50 and outputs "00" as a control value to the DA converter 49. Then, the processor 46 turns on the switch 50 to drive the laser diodes 120 to 122 through the drive amplifier 51.

③ The processor 46 increments the control value by 1 and outputs the incremented control value to the DA converter 49, thereby driving the laser diode (120 to 122) through the drive amplifier 51.

④ The processor 46 reads the monitor light quantity of each of the laser diodes 120 to 122 through the AD converter 52 and decides whether or not the light power of the laser diode (120 to 122) coincides with the specified power. If the light power is lower than the specified power, the processor 46 returns to Step ③.

⑤ If the light power of the laser diode (120 to 122) coincides with the specified power, the processor 46 stores the control value presently output to the DA converter 49 into the RAM 48.

⑥ The processor 46 decides whether or not the operation of Steps ① to ⑤ has been repeated 10 times. If NO, the processor 46 returns to Step ②.

⑦ When deciding that the operation of Steps ① to ⑤ has been repeated 10 times, the processor 46 reads out the control values for the 10 control operations from the RAM 48 and calculates an average value Pc.

⑧ Next, the processor 46 compares the average value Pc with the sum of the initial value Pi and an increment limit value ("20"). If the average value Pc is not equal to or larger than (Pi+20), the processor 46 declares that the lifetime of the laser diode (120 to 122) has not yet expired, and terminates the adjustment. Then, the processor 46 drives the laser diode (120 to 122) with the output presently delivered to the DA converter 49.

⑨ If the average value Pc is equal to or larger than (Pi+20), the processor 46 decides that the lifetime of the laser diode (120 to 122) has expired, and sends back the LD (Laser Diode) lifetime status to the upper-level controller. In FIG. 8(B), the drive current values I3 and I4 on the chain-line curve are those by which the lifetimes of the laser diodes 120 to 122 are decided to have expired. Thus, the upper-level controller can take measurement, for example, to stop the operation, to notice the operator of the situation, etc. Further, the processor 46 sets up an LD lifetime flag in the non-volatile memory 47 and terminates the emission adjustment. The upper-level controller is informed of the LD lifetime flag as a status to be read out during initial processing.

In this way, a control value with which the laser diode 120 provides predetermined light power is measured at the time of startup of the drive (before shipment from the factory) and stored in the memory as an initial value. Then, a control value, which is adjusted during emission adjustment made when the power supply is turned on in actual use, is compared with the initial value to check the lifetime of the laser diode 120. Thus, accurate lifetime checking can be made in accordance with the characteristics of the laser diode 120, etc. in each individual drive.

In addition, since the measurement of a control value is repeated to obtain an average control value, an accurate control value can be measured. To expect higher accuracy, the initial value is obtained by executing the measurement 16 times. When the power supply is turned on in actual use, the measurement is executed 10 times so that the start of the operation will not be delayed. In addition, since the initial value is stored in the non-volatile memory 47, it can be held even when the power supply is off. Thus, there is no likelihood of the initial value being lost.

Figure 11:
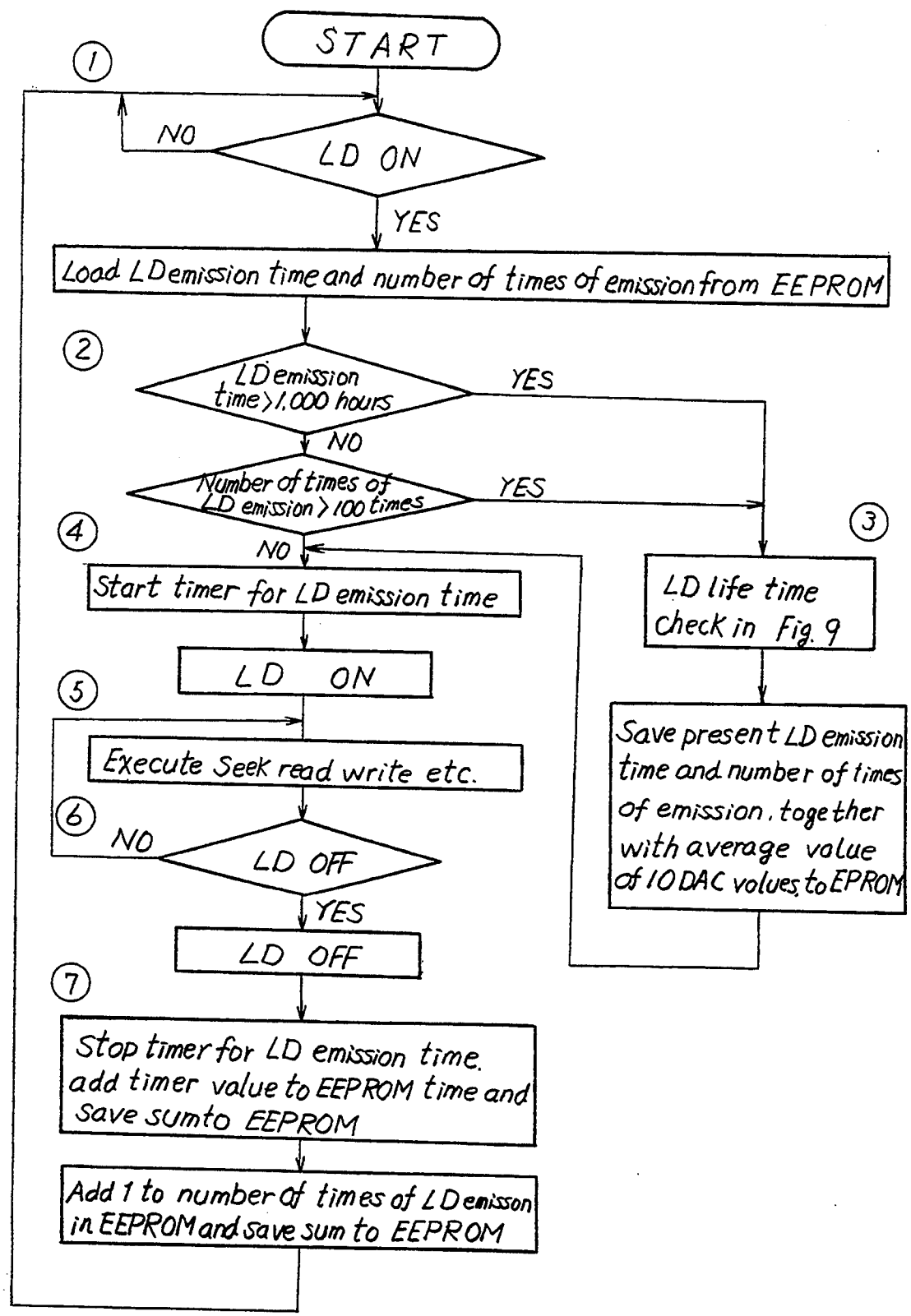
FIG. 11 is a flowchart showing another example of the lifetime checking processing for the laser light source shown in FIG. 8.

FIG. 11 is a flowchart showing another example of the laser diode lifetime checking processing.

In this embodiment, the startup processing is the same as that shown in FIG. 9.

This embodiment is arranged so that lifetime checking processing is executed in a fixed cycle even in a magneto-optical disk library system in which the power supply is not turned on/off frequently.

① The processor 46 decides whether or not a command including LD (Laser Diode) ON (e.g., spindle ON command) has arrived from the upper-level controller or a magneto-optical disk cartridge 2 has been inserted. If YES, the processor 46 reads out the LD emission time and the number of times of LD emission from the non-volatile memory 47 and loads them into the RAM 48.

② The processor 46 decides whether or not the loaded emission time exceeds 1,000 hours. If YES, the processor 46 proceeds to lifetime checking processing executed at Step ③. If it is decided that the loaded emission time does not exceed 1,000 hours, the processor 46 decides whether or not the loaded number of times of emission exceeds 100 times. If YES, the processor 46 proceeds to the lifetime checking processing executed at Step ③. If it is decided that the loaded number of times of emission does not exceed 100 times, the processor 46 proceeds to Step ④.

③ The processor 46 executes the LD lifetime checking processing shown in FIG. 10 (Steps ① to ⑨), and stores the present LD emission time and the present number of times of emission, together with an average value of control values for 10 control operations, into the non-volatile memory 47. Then, the processor 46 proceeds to Step ④.

④ The processor 46 starts a timer for LD emission time and turns on the laser diode 120, etc. (that is, turns on the switch 50).

⑤ The processor 46 executes, seek, read, write, etc. in response to a command from the upper-level controller.

(6) The processor 46 decides whether or not a command including LD OFF (e.g., spindle OFF command) has arrived from the upper-level controller or the magneto-optical disk cartridge 2 has been ejected. If NO, the processor 46 returns to Step (5), whereas, if YES is the answer, the processor 46 turns off the laser diode 120 (that is, turns off the switch 50).

(7) The processor 46 stops the timer for LD emission time. Then, the processor 46 adds the timer value to the emission time read out from the non-volatile memory 47 and stores the sum into the non-volatile memory 47. Next, the processor 46 adds "1" to the number of times of emission read out from the non-volatile memory 47 and stores the sum into the non-volatile memory 47. Then, the processor 46 returns to Step (1).

Thus, in a magneto-optical disk drive connected to a computer where the power supply is not turned off, the emission time of the laser diode 120 and the number of times of emission thereof are counted, and when a predetermined time (1,000 hours) or a predetermined number of times (100 times) is reached, the lifetime checking processing for the laser diode 120, shown in FIG. 10, is executed. Thereafter, the laser diode 120 is turned on to perform a given operation. Accordingly, even if the power supply is not turned off, emission adjustment and lifetime checking are made every predetermined unit of emission time or every predetermined number of times of emission. Thus, it is possible to check the lifetime of the laser diode beforehand.

Although in the embodiment shown in FIG. 11 both the emission time and the number of times of emission are checked, either of them may be checked. Further, although the number of times of operation in the embodiment shown in FIG. 9 is 16 times and the number of times of operation in FIG. 10 is 10 times, the present invention is not necessarily limited thereto. Further, although in the embodiment shown in FIG. 11 the predetermined emission time is 1,000 hours and the predetermined number of times of emission is 100 times, the present invention is not necessarily limited thereto. Further, although in the embodiment shown in FIG. 10 the increment limit value is "20", it may be other value.

Thus, an initial value of the laser light source of the drive concerned is measured and stored in the memory, and it is compared with an adjusted value with which an emission adjustment has been made in actual use to thereby check the lifetime of the laser light source. Therefore, accurate lifetime checking can be made in accordance with the performance of each individual drive. In addition, since the measured initial value is stored in the non-volatile memory, even if the power supply is turned off, it can be held and will not be lost. Accordingly, accurate lifetime checking can be performed at all times.

The following is a description of the processing for optimizing a write condition value for the optical head 10.

Figure 12:
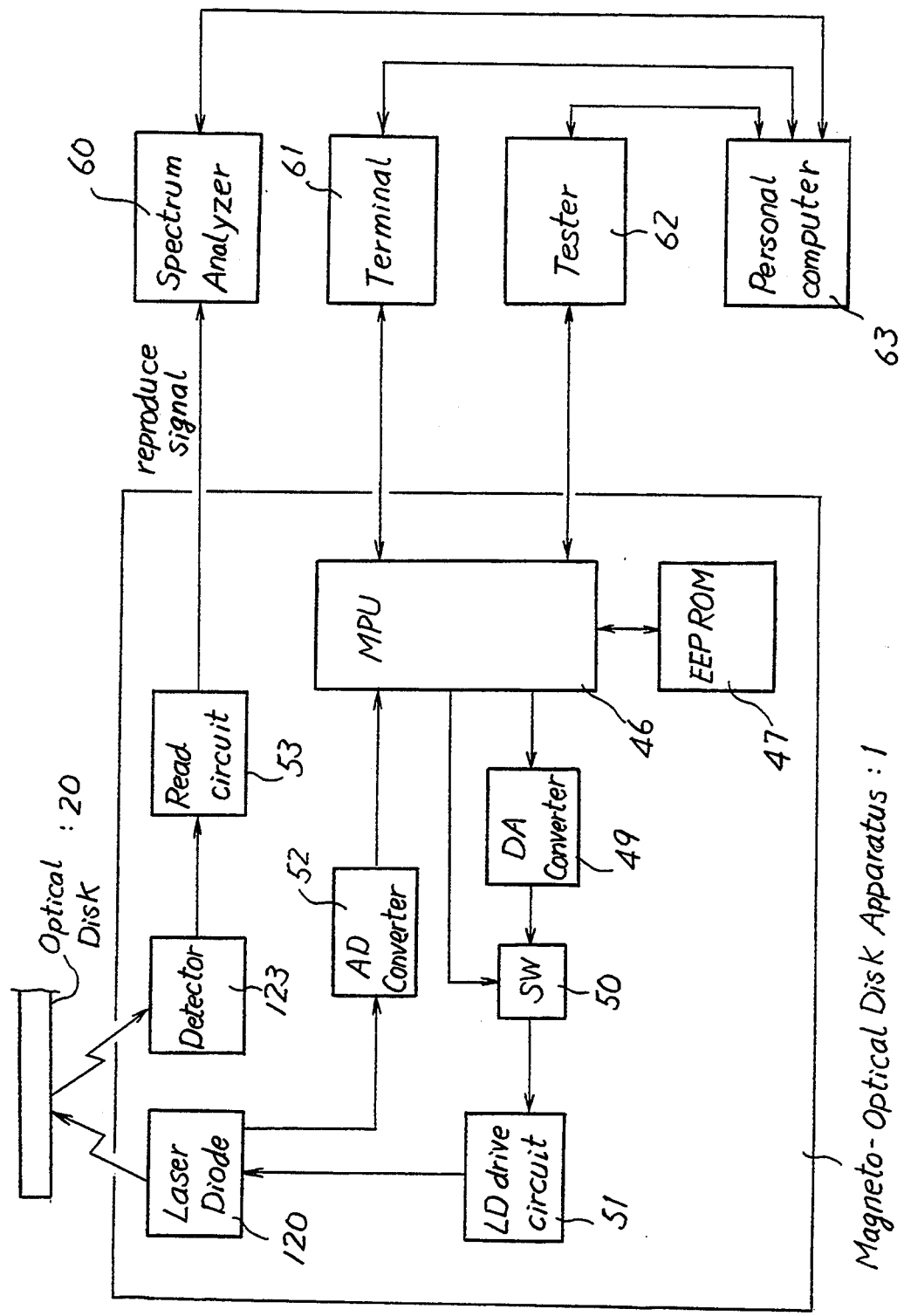
FIG. 12 is a block diagram for explanation of measurement of optimum write characteristics according to the present invention.

FIG. 12 is a block diagram for explanation of optimum write condition measuring processing, and FIG. 13 is a flowchart showing the processing.

In FIG. 12, the same constituent elements as those described in connection with FIGS. 2 to 7 are denoted by the same reference numerals. A spectrum analyzer 60 is fed with an analog reproduced signal from the read circuit 53 before pulse shaping to analyze the spectrum of the reproduced signal so as to measure CNR (Carrier-to-Noise Ratio). For example, TR-4171 spectrum analyzer (available from K.K. Advantest) may be employed as the spectrum analyzer 60. A terminal 61 is used to input a measured optimum value to the processor 46 of the magneto-optical disk drive 1. A tester 62 is used to set a write power set value to the processor 46 of the magneto-optical disk drive 1 and activate it. A personal computer 63 controls the spectrum analyzer 60, the terminal 61 and the tester 62. These units 60 to 53 constitute a measuring device.

In this embodiment, at the time of startup of the magneto-optical disk drive 1 before shipment, the measuring device (60 to 63) is connected to the disk drive 1 to measure optimum write power and to write the optimum write power obtained into the non-volatile memory 47 of the magneto-optical disk drive 1. The operation for this processing will be explained below with reference to the flowchart of FIG. 13(A), which shows measuring processing at the time of startup of the drive 1.

(1) First, an optical disk cartridge 2 for testing is loaded into the magneto-optical disk drive 1, shown in FIG. 2. Then, measurement is initiated. That is, a write power set value (default value −2 mW) is set as an initial value to the processor 46 from the tester 62, and the system is then activated.

(2) The tester 62 gives the processor 46 the write power present value +0.2 mW as a write power set value. The processor 46 outputs it through the DA converter 49 to the laser driver circuit 51. In addition, write data is given to the laser driver circuit 51 from the tester 62. Thus, the laser diode 120 is driven to emit light with the write power set value, thereby writing the write data to the magneto-optical disk 20 in the optical disk cartridge 2 loaded.

(3) Next, the processor 46 gives a read instruction to the laser driver circuit 51 to drive the laser diode 122 with the read power, thereby applying read light to the magneto-optical disk 20. Reflected light from the magneto-optical disk 20 is received and converted into an electric signal by the detector 123, and a reproduced signal of readout data is generated by the read circuit 53. The spectrum analyzer 60 analyzes the waveform of the readout data signal to measure CNR (Carrier-to-Noise Ratio) and informs the personal computer 63 of the measured value. The personal computer 63 writes the measured value into the built-in memory.

(4) The tester 62 decides whether or not the write power set value has reached the default value +2 mW (measurement limit value). If NO, the tester 62 returns to Step (2). If the write power set value has reached the measurement limit value, the tester 62 informs the personal computer 63 of the termination of the measurement.

(5) The personal computer 63 obtains a write power set value (optimum write power value) with which CNR reaches a maximum by comparing CNRs obtained in 20 measuring operations. Then, the personal computer 63 informs the terminal 61 of the optimum write power value. Thus, the measured optimum write power value is output from the terminal 61 to the processor 46 and written into the non-volatile memory 47 so as to be saved.

In this way, various write power values are set from the measuring device, and a write power value with which CNR reaches a maximum is measured by the measuring device and written into the non-volatile memory 47 of the magneto-optical disk drive 1. Since the optimum write power value is written into the non-volatile memory 47, it will not be lost even when the power supply is turned off.

Next, processing executed when the power supply is turned on will be explained with reference to FIG. 13(B).

⑥ When the power supply is turned on, the processor 46 reads out the optimum write power value from the non-volatile memory 47 and loads it into the built-in RAM 48.

⑦ The processor 46 sets the loaded optimum write power value in a write condition table in the RAM 48. Thereafter, each time a write command arrives from the upper-level controller, the processor 46 outputs the optimum write power value to the DA converter 49 to drive the laser diode 120 with the optimum write power value (current value) by the laser driver circuit 51.

Thus, the magneto-optical disk drive 1 is provided with the non-volatile memory 47, and a write power value with which the CNR of the reproduced signal reaches a maximum, which is automatically measured by the measuring device, is stored in the non-volatile memory 47 beforehand. When the power supply is turned on in actual use, the stored write power value is read out and set as a drive current value for the laser diode. Accordingly, it is possible to write data with write power which is the most suitable for each individual drive. Thus, the read/write performance improves.

Although the foregoing description has been made with regard to the write power as a write condition, the above-described scheme may also be applied to other write condition values, for example, write pulse width. Although in the foregoing the write power value is stored in the non-volatile memory 47, the arrangement may also be such that a write power default value is stored in the ROM of the processor, while a correction value for the default value is stored in the non-volatile memory 47, and when the power supply is turned on in actual use, the processor calculates an optimum write power value from the correction value and the default value.

Although in the foregoing a write condition value with which the CNR of the reproduced signal reaches a maximum is used an optimum value, it is also possible to measure a write condition value with which the bit error rate of the reproduced signal reaches a minimum because an optimum write condition is available when the bit error rate of the reproduced signal is at a minimum. It is also possible to measure as an optimum value a write condition value with which the CNR of the reproduced signal reaches a maximum and, at the same time, the bit error rate reaches a minimum.

Although in the foregoing embodiment an optimum write condition value is measured at one position on the magneto-optical disk drive 1, the arrangement may be such that two optimum write condition values are measured at two points, for example, the innermost and outermost positions, on the medium and stored in the memory, and either of the optimum write condition values is selected in accordance with the seek position.

Further, since the optimum write condition value varies according to the kind of medium forming the magneto-optical disk and the ambient temperature, it may be an effective way of optimizing the write condition value to measure and store optimum write condition values for various kinds of mediums and various temperatures and to select an optimum write condition value in accordance with the kind of medium used and the ambient temperature.

Thus, an optimum write condition value for the drive concerned is measured and stored beforehand, and it is read out and set as a drive value when the operation is initiated. Therefore, write control can be effected with a write condition value which is the most suitable for the drive concerned even if there is variation in the write performance among drives. Thus, the write performance can be improved. In addition, since an optimum write condition value which is obtained by measurement is stored, the write control can cope with automation. Further, since the measured optimum value is stored in the non-volatile memory, it can be held and will not be lost even when the power supply is turned off. Thus, optimum write control can be performed at all times.

The following is a description of a drive condition management method that employs the non-volatile memory 47.

Figure 14:
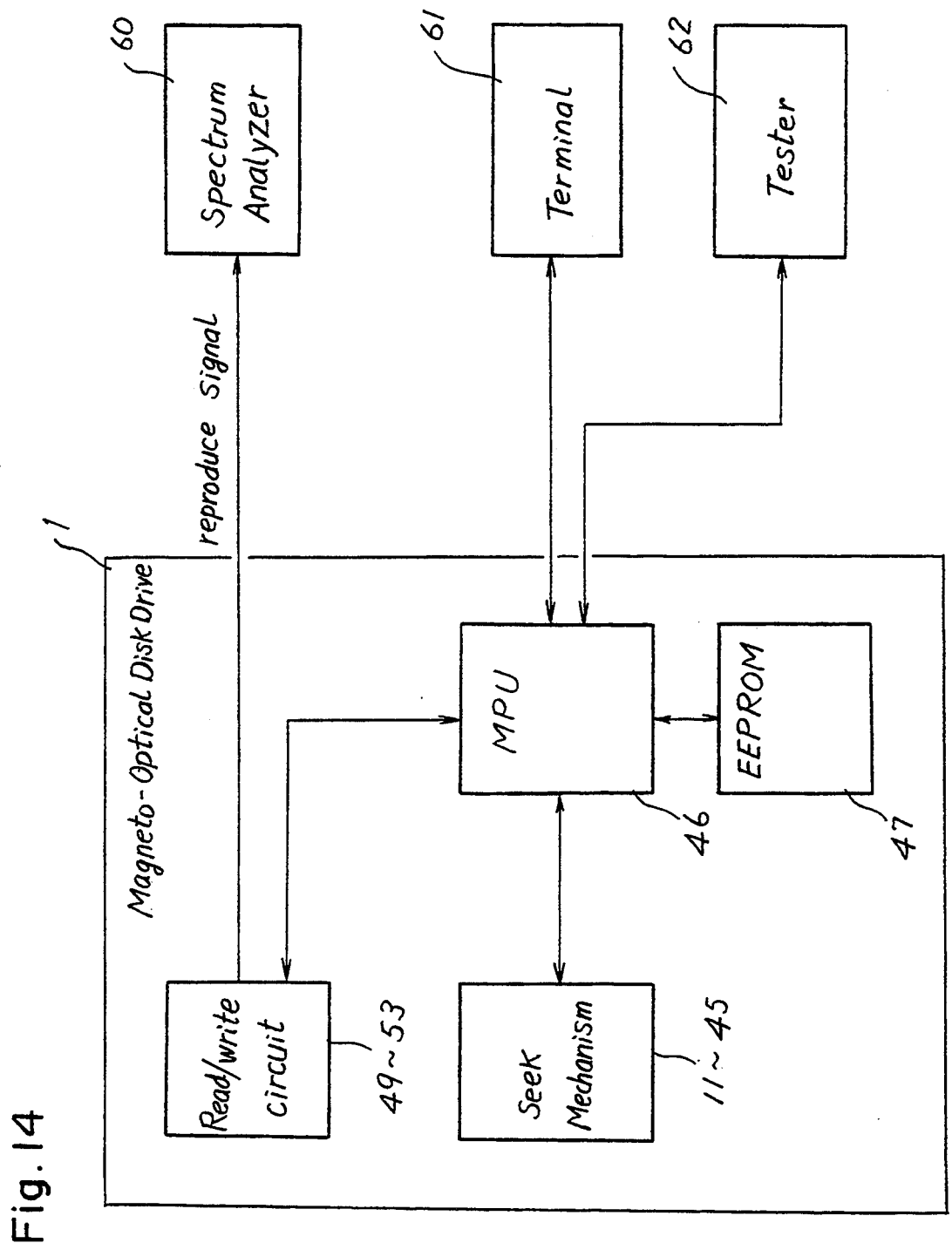
FIG. 14 is a block diagram showing an arrangement for measuring operating performance according to the present invention.
Figure 15:
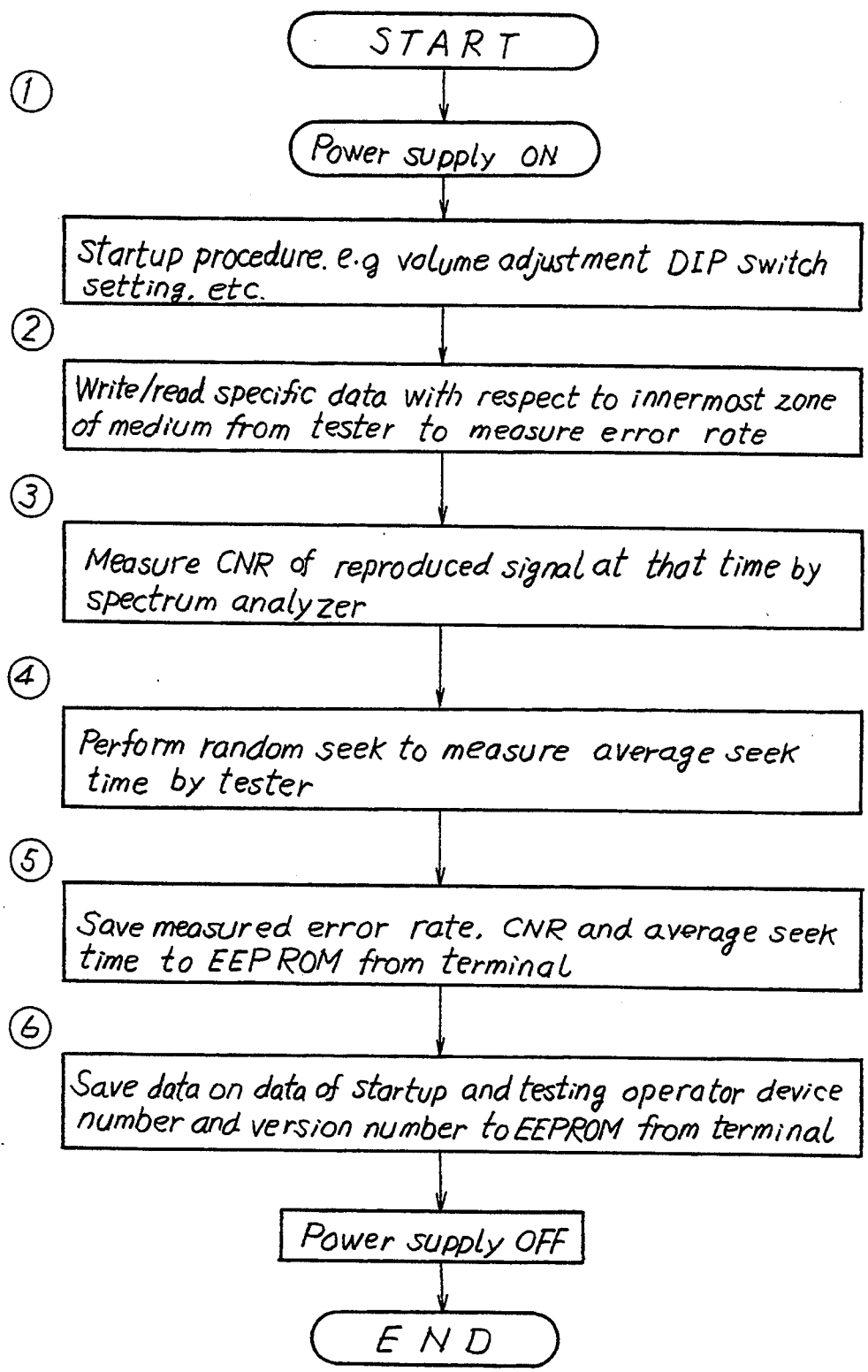
FIG. 15 is a flowchart showing operating performance writing processing executed by the arrangement shown in FIG. 14.
Figure 16:
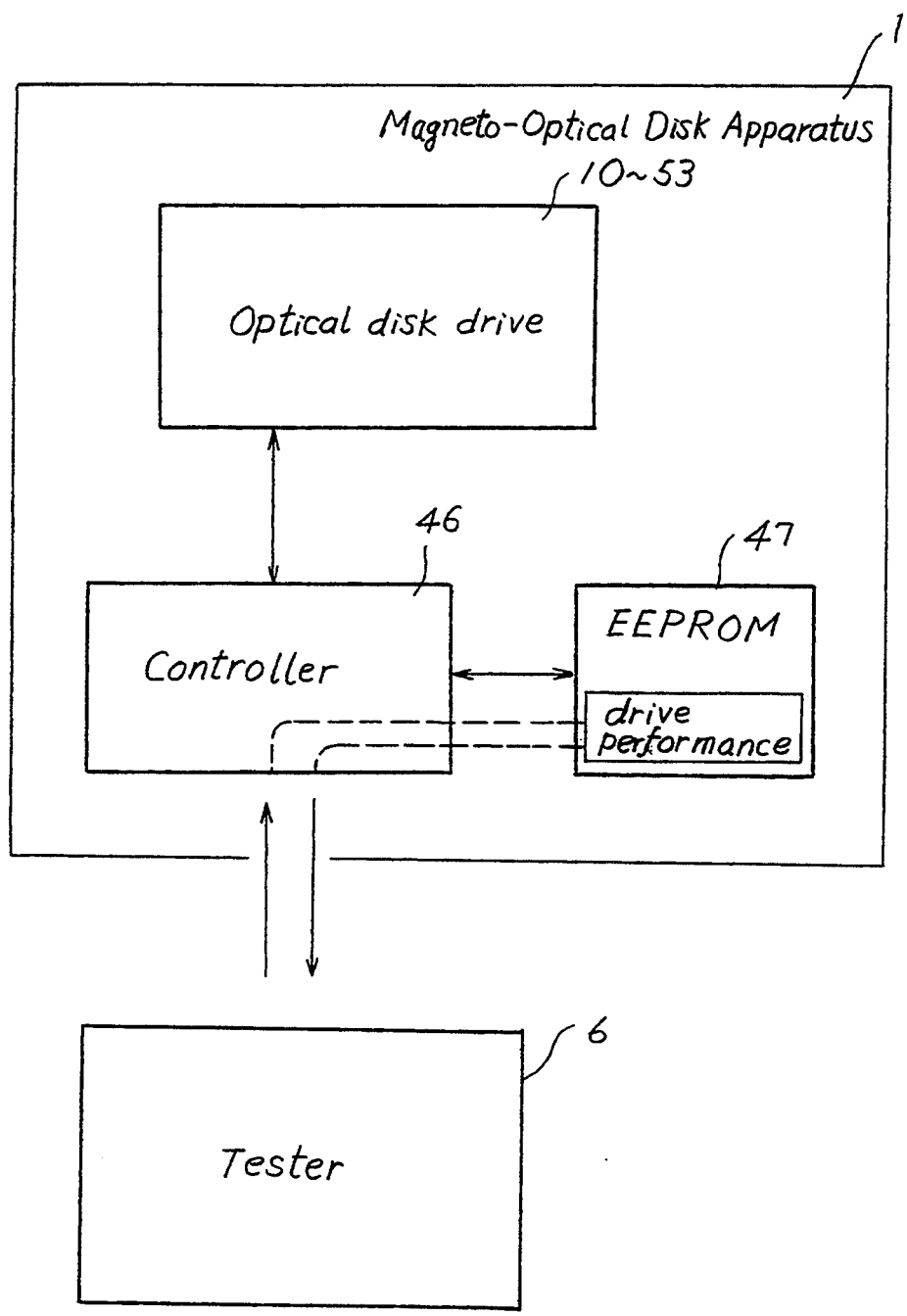
FIG. 16 is a block diagram showing a way of using operating performance data obtained by the processing shown in FIG. 15.

FIG. 14 is a block diagram showing an arrangement for measuring drive conditions, and FIG. 15 is a flowchart showing processing for the measurement. FIG. 16 is a block diagram showing a way of using drive condition data obtained by the measurement.

In FIG. 14, reference numeral 60 denotes the above-described spectrum analyzer that analyzes the spectrum of a reproduced signal applied thereto from the read/write circuit 53 before being digitized to measure CNR (Carrier-to-Noise Ratio). A terminal 61 has a display unit and an input unit so that a measured value is input to the processor 46 of the magneto-optical disk drive 1 through the input unit (keyboard) and the measured value is read out from the non-volatile memory 47 and displayed on the display unit. A tester 62 issues a seek command to the processor 46 to execute a seek operation and measures the seek time and the read/write error rate. The tester 62 is a personal computer. The spectrum analyzer 60, the terminal 61 and the tester 62 constitute a testing device 6.

Measuring processing executed at the time of startup of the drive (before shipment) will be explained below with reference to FIG. 15.

① An optical disk cartridge 2 for testing is loaded into the magneto-optical disk drive 1, shown in FIG. 1. Then, the power supply is turned on, and a startup procedure is carried out, for example, adjustment of a volume (not shown) of the magneto-optical disk drive 1, setting of DIP switches, etc.

② The tester 62 instructs the processor 46 of the magneto-optical disk drive 1 to write/read specific data a plurality of times with respect to the innermost zone of the magneto-optical disk 20 in the optical disk cartridge 2. Thus, under control of the processor 46, the read/write circuit (49 to 53) allows the optical head 10 to write data to the magneto-optical disk 20 and then makes the optical head 10 read the data from the magneto-optical disk 20. Then, the processor 46 instructs the read circuit 53 to check the readout data by ECC (Error Correction Code). The processor 46 is informed of the result of the check by ECC, measures the error rate, and instructs the terminal 61 to display the measured error rate.

③ The spectrum analyzer 60 analyzes the spectrum of the reproduced signal of readout data at that time to measure the CNR of the reproduced signal.

④ Next, the tester 62 instructs the processor 46 of the magneto-optical disk drive 1 to perform a random seek. Consequently, the seek system (10 to 45) performs random seeks on the basis of the above-described track count under control of the processor 46. For each seek operation, the tester 62 receives a seek completion signal from the processor 46. The tester 62 measures the seek time for each seek and calculates an average seek time.

(5) After completion of the measurement, the measured error rate, CNR and average seek time are input to the processor 46 of the magneto-optical disk drive 1 from the terminal 61 so as to be written into the non-volatile memory 47.

(6) Similarly, data such as the date (year, month and day) of startup and testing, the operator, and the device number and version number of the drive concerned are input to the processor 46 of the magneto-optical disk drive 1 from the terminal 61 so as to be written into the non-volatile memory 47. Then, the power supply is turned off to terminate the measurement.

Thus, operating performance measured at the time of startup of the drive or at the time of testing, that is, the seek time and the write/read performance, can be stored in the non-volatile memory 47 provided in the drive.

During the operation in the field after the shipment, the processor 46, when detecting occurrence of an error, stores the error contents into the non-volatile memory 47 in the form of an error code.

At the time of extra maintenance (when a fault occurs) or regular maintenance, the testing device 6 is connected to the magneto-optical disk drive 1, as shown in FIG. 16, whereby the drive performance or other data can be read out from the non-volatile memory 47 and displayed or printed out through the processor 46 of the magneto-optical disk drive 1. Thus, when a maintenance person or the like measures the drive performance after adjustment of the magneto-optical disk drive 1 or replacement of a unit during the above-described maintenance by connecting the testing device 6 to the drive 1, it is possible to make a diagnosis on the drive performance by comparing the measured performance with the drive performance read out from the non-volatile memory 47.

If the logged error contents are read out, the cause of a fault or the like can readily be analyzed; if the version number of the drive and the date of the testing are read out, it becomes easy to cope with the fault.

Thus, the magneto-optical disk drive 1 is provided with the non-volatile memory 47, and the measured drive performance is stored in the memory 47. Therefore, it is unnecessary to manage data on the drive performance by specially using a data sheet or the like for each individual drive. Accordingly, the maintenance person is only required to read out the drive performance from the non-volatile memory 47 in the field. Thus, the management of the drive performance is facilitated, and an accurate diagnosis can be made.

As the above-described testing device, a special testing device which can input data may be employed. It is also possible to store a measured value obtained by measurement during each maintenance into a non-volatile memory 47 so as to record a history of operating performance.

Thus, the magneto-optical disk drive 1 is provided with the non-volatile memory 47, and the measured drive performance is stored in the memory 47. Therefore, it is unnecessary to manage data on the drive performance by specially using a data sheet or the like for each individual drive, and it is only necessary to read out the drive performance from the non-volatile memory 47 in the field. Thus, the management of the drive performance is facilitated. In addition, since the data on the operating performance is stored in each individual drive, it is possible to make an accurate diagnosis on the performance of the drive at the time of adjustment, replacement or maintenance.

As many apparently widely different embodiments of the present invention can be made without departing from the spirit and scope thereof, it is to be understood that the invention is not limited to the specific embodiments thereof except in the appended claims.

What we claim is:

1. A controller for an optical storage drive including an optical head having a laser light source for applying light to an optical storage medium and a detector for receiving reflected light from said optical storage medium and for converting the received light into an electric signal, and a seek mechanism for positioning said optical head to a target position on said optical storage medium to, at least, read information from said target position on said optical storage medium by said optical head, said controller comprising:

a non-volatile memory stored with a calibration drive current value, said calibration drive current value being stored in said non-volatile memory during a calibration emission adjustment wherein the calibration drive current value for said laser light source is obtained by varying a drive current such that said laser light source substantially provides a predetermined light power output value; and a control circuit that compares a measured drive current value obtained during an operational emission adjustment made when said drive is operated, with said calibration drive current value stored in said non-volatile memory, thereby checking the lifetime of said laser light source.

2. A controller for an optical storage drive as defined in claim 1, wherein said control circuit comprises means for executing the operational emission adjustment when said drive is operated in response to turning on a power supply of said optical storage drive, thereby checking the lifetime of said laser light source.

3. A controller for an optical storage drive as defined in claim 1, wherein said control circuit comprises means for either counting emission time, or counting a number of times of emission of said laser light source, and executing the operational emission adjustment when said drive is operated either every predetermined number of units of emission time or every predetermined number of times of emission, thereby checking the lifetime of said laser light source.

4. A controller for an optical storage drive as defined in claim 1, wherein said control circuit comprises means for writing an adjusted drive current value into said non-volatile memory every time said operational emission adjustment is made.

5. A controller for an optical storage drive as defined in claim 1, wherein said control circuit comprises means for informing an upper-level controller connected to said control circuit when said control circuit has determined that the lifetime of said laser light source has expired.

6. A controller for an optical storage drive as defined in claim 1, wherein said control circuit comprises means for writing information representative of a determination regarding the lifetime of said laser light source into said non-volatile memory, when deciding that the lifetime of said laser light source has expired.

7. A controller for an optical storage drive as defined in claim 1, wherein said optical storage medium is an optical disk, said optical storage drive having means for driving said optical disk to rotate.

8. A controller for an optical storage drive including an optical head having a laser light source for applying light to an optical storage medium and a detector for receiving reflected light from said optical storage medium and for converting the received light into an electric signal, and a seek mechanism for positioning said optical head to a target position on said optical storage medium to write information to said target position on said optical storage medium and to read information from said target position by said optical head, said controller comprising:

a non-volatile memory stored with a calibration write power value adapted to provide optimum write performance, said calibration write power value being determined by writing information to said optical storage medium with a write power value for said laser light source, said write power value being varied such that optimum write performance is obtained; and a control circuit that reads out said calibration write power value from said non-volatile memory at the time of starting an operation of said drive and controls the drive of said laser light source with said calibration write power value.

9. A controller for an optical storage drive as defined in claim 8, wherein said calibration write power value stored in said non-volatile memory is a drive current value with which said laser light source provides optimum write power.

10. A controller for an optical storage device as defined in claim 8, comprising means for providing an optimum write drive pulse width for said laser light source from said calibration write power value stored in said non-volatile memory.

11. A controller for an optical storage drive as defined in claim 8, wherein said calibration write power value stored in said non-volatile memory is a correction value for a preset default write power value, said control circuit comprising means for calculating an optimum write power value from said correction value read out from said non-volatile memory and said preset default write power value read out from said non-volatile memory, and means for controlling the drive of said laser light source with said calculated optimum write power value.

12. A controller for an optical storage drive as defined in claim 8, comprising means for measuring said write power value that provides said optimum write performance in such a manner that after information has been written to said optical storage medium, said laser light source is driven to emit light with a read power value, and reflected light from said optical storage medium is detected by said detector to measure a carrier-to-noise ratio of a reproduced signal obtained by reading said information written to said optical storage medium, thereby obtaining a write power value with which said carrier-to-noise ratio reaches a maximum.

13. A controller for an optical storage drive as defined in claim 8, comprising means for measuring said write power value that provides optimum write performance in such a manner that after information has been written to said optical storage medium, said laser light source is driven to emit light with a read power value, and reflected light from said optical storage medium is detected by said detector to measure a bit error rate of a reproduced signal obtained by reading said information written to said optical storage medium, thereby measuring a write power value with which said bit error rate reaches a minimum.

14. A controller for an optical storage drive as defined in claim 8, wherein said optical storage medium is an optical disk, said optical storage drive having means for driving said optical disk to rotate.

15. A controller for an optical storage drive as defined in claim 14, wherein a plurality of write power values are stored in said non-volatile memory representing optimum write condition values measured for each of a plurality of zones of said optical disk, said control circuit comprising means for reading out an optimum write condition value for a zone corresponding to a write position on said optical disk from said non-volatile memory, and means for controlling the drive of said laser light source on the basis of said optimum write condition value.

16. A controller for an optical storage drive as defined in claim 14, wherein the calibration write power value stored in said non-volatile memory is an optimum write condition value measured for each of a plurality of different kinds of optical disks, said control circuit comprising means for reading out an optimum write condition value corresponding to the kind of optical disk concerned from said non-volatile memory, and means for controlling the drive of said laser light source on the basis of said optimum write condition value.

17. A controller for an optical storage drive as defined in claim 14, wherein a plurality of write power values stored in said non-volatile memory are optimum write condition values measured at each of a plurality of ambient temperatures, said control circuit comprising means for reading out an optimum write condition value corresponding to a particular ambient temperature from said non-volatile memory, and means for controlling the drive of said laser light source on the basis of said optimum write condition value.

18. A controller for an optical storage drive including an optical head having a laser light source for applying light to an optical storage medium and a detector for receiving reflected light from said optical storage medium and for converting the received light into an electrical signal, and a seek mechanism for positioning said optical head to a target position on said optical storage medium to write information to said target position on said optical storage medium and to read information from said target position by said optical head, said controller comprising:

a non-volatile memory stored with data on measured operating performance of said optical storage drive, said data including data on at least one of read/write performance and seek performance; and a control circuit for controlling movement of said optical head, controlling said seek mechanism, reading out said operating performance data from said non-volatile memory, and using said operating performance data to control movement of said optical head and said seek mechanism.

19. A control method for an optical storage drive including an optical head having a laser light source for applying light to an optical storage medium and a detector for receiving reflected light from said optical storage medium and for converting the received light into an electric signal, and a seek mechanism for positioning said optical head to a target position on said optical storage medium to, at least, read information from said target position on said optical storage medium by said optical head, said control method comprising the steps of:

measuring a drive current value with which said laser light source provides a predetermined light power output value in a calibration emission adjustment, said calibration emission adjustment made by varying the drive current value for said laser light source under control of a control circuit;

storing said measured drive current value into a non-volatile memory as a calibration drive current value;

adjusting the emission of said laser light source when said optical storage drive is operated so that said laser light source provides the predetermined light power output value by varying the drive current value for said laser light source under control of said control circuit to provide an operational drive current value; and comparing the operational drive current value with which the emission adjustment has been made at the time of operating said optical storage drive, with said calibration drive current value stored in said non-volatile memory by said control circuit, thereby checking the lifetime of said laser light source.

20. A control method for an optical storage drive as defined in claim 19, further comprising the step where when deciding that the lifetime of said laser light source has expired, said control circuit writes information representative of the decision of the lifetime of said laser light source into said non-volatile memory.

21. A control method for an optical storage drive as defined in claim 19, wherein said control circuit executes the emission adjusting step, which is carried out when said drive is operated, in response to turning on a power supply of said drive, thereby checking the lifetime of said laser light source.

22. A control method for an optical storage drive as defined in claim 19, wherein said control circuit executes the emission adjusting step, which is carried out when said drive is operated, either every predetermined number of units of emission time or every predetermined number of times of emission of said laser light source, thereby checking the lifetime of said laser light source.

23. A control method for an optical storage drive as defined in claim 19, further comprising a step wherein said control circuit writes said operational drive current value into said non-volatile memory every time said emission adjustment is made.

24. A control method for an optical storage drive as defined in claim 19, further comprising a step wherein when deciding that the lifetime of said laser light source has expired, said control circuit informs an upper-level controller connected to said control circuit that the lifetime of said laser light source has expired.

25. A control method for an optical storage drive including an optical head having a laser light source for applying light to an optical storage medium and a detector for receiving reflected light from said optical storage medium and for converting the received light into an electric signal, and a seek mechanism for positioning said optical head to a target position on said optical storage medium to write information to said target position on said optical storage medium and to read information from said target position by said optical head, said control method comprising the steps of:

measuring a calibration write power value providing optimum write performance by writing information to said optical storage medium with a write power value for said laser light source being varied by using a testing device connected to said optical storage drive;

storing said calibration write power value into a non-volatile memory; and reading out said calibration write power value from said non-volatile memory at the time of starting an operation of said drive and controlling the drive of said laser light source with said calibration write power value under control of a control circuit.

26. A control method for an optical storage drive as defined in claim 25, wherein said measuring step is the step wherein after information has been written to said optical storage medium with the calibration write power value, said laser light source is driven to emit light with a read power value, and reflected light from said optical storage medium is detected by said detector to measure a bit error rate of a reproduced signal obtained by reading said information written to said optical storage medium, thereby measuring a write power value with which said bit error rate reaches a minimum.

27. A control method for an optical storage drive as defined in claim 25, wherein said measuring step is the step of measuring a drive current value with which said laser light source provides optimum write power, and said storing step being the step of writing said drive current value into said non-volatile memory as the calibration write power value.

28. A control method for an optical storage drive as defined in claim 25, wherein said measuring step is the step of measuring an optimum write drive pulse width for said laser light source, and said storing step being the step of writing said drive pulse width measured into said non-volatile memory.

29. A control method for an optical storage drive as defined in claim 25, wherein said storing step is the step of writing into said non-volatile memory a correction value for a default write power value set for measured optimum write power value, and said drive control step being the step of calculating an optimum write power value from the correction value read out from said non-volatile memory and the present default write power value read out from said non-volatile memory, and of controlling the drive of said laser light source with said optimum write power value.

30. A control method for an optical storage drive as defined in claim 25, wherein said measuring step is the step wherein after information has been written to said optical storage medium with the calibration write power value, said laser light source is driven to emit light with a read power value, and reflected light from said optical storage medium is detected by said detector to measure a carrier-to-noise ratio of a reproduced signal obtained by reading said information written to said optical storage medium, thereby measuring a write power value with which said carrier-to-noise ratio reaches a maximum.

* * * * *

UNITED STATES PATENT AND TRADEMARK OFFICE
CERTIFICATE OF CORRECTION

PATENT NO. : 5,392,273
DATED : February 21, 1995
INVENTOR(S) : Masaki et al.

It is certified that error appears in the above-indentified patent and that said Letters Patent is hereby corrected as shown below:

Column 10, line 2, delete "FEB" and insert --FES--.

Column 13, line 2, delete "e,crc/1/" and insert --①--.

Signed and Sealed this

Third Day of October, 1995

Attest:

BRUCE LEHMAN

*Attesting Officer*  *Commissioner of Patents and Trademarks*